US011368918B2

(12) United States Patent
Ryu et al.

(10) Patent No.: US 11,368,918 B2
(45) Date of Patent: Jun. 21, 2022

(54) USING A SPATIAL REFERENCE SIGNAL FOR PATHLOSS DETERMINATION

(71) Applicant: QUALCOMM Incorporated, San Diego, CA (US)

(72) Inventors: Jung Ho Ryu, Fort Lee, NJ (US); Yan Zhou, San Diego, CA (US); Kiran Venugopal, Raritan, NJ (US); Tianyang Bai, Bridgewater, NJ (US); Junyi Li, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 16/883,349

(22) Filed: May 26, 2020

(65) Prior Publication Data

US 2020/0389849 A1 Dec. 10, 2020

Related U.S. Application Data

(60) Provisional application No. 62/858,235, filed on Jun. 6, 2019.

(51) Int. Cl.
*H04W 52/14* (2009.01)
*H04B 17/30* (2015.01)

(52) U.S. Cl.
CPC .......... *H04W 52/146* (2013.01); *H04B 17/30* (2015.01)

(58) Field of Classification Search
CPC ... H04W 52/146; H04W 52/40; H04W 52/50; H04W 52/242; H04W 52/42;

(Continued)

(56) References Cited

U.S. PATENT DOCUMENTS 8,520,542 B2 * 8/2013 Chang ................. H04W 52/241
370/252
8,675,602 B2 * 3/2014 Yang .................. H04W 52/243
370/331

(Continued)

FOREIGN PATENT DOCUMENTS

WO WO-2017146773 A1 8/2017
WO WO-2018175784 A1 9/2018

OTHER PUBLICATIONS

International Search Report and Written Opinion—PCT/US2020/034624—ISAEPO—dated Sep. 11, 2020.

*Primary Examiner* — Lana N Le
(74) *Attorney, Agent, or Firm* — Holland & Hart LLP

(57) ABSTRACT

Methods, systems, and devices for wireless communications are described. A user equipment (UE) may transmit, to a base station, a configuration signal indicating that the UE supports using a spatial reference signal for a channel performance measurement procedure. The UE may receive an activation signal from the base station activating the spatial reference signal for the channel performance measurement procedure. The UE may perform, based at least in part on the activation signal, the channel performance measurement procedure using the spatial reference signal transmitted by the base station, wherein the channel performance measurement procedure comprises pathloss estimation of a channel. The UE may select, based at least in part on a result of the channel performance measurement procedure, a transmission power for an uplink transmission to the base station. The UE may perform the uplink transmission to the base station based at least in part on the transmission power.

32 Claims, 17 Drawing Sheets

(58) Field of Classification Search
CPC . H04W 52/245; H04W 52/10; H04W 52/241; H04W 52/08; H04B 17/30; H04B 7/0695; H04B 17/309; H04L 5/0048; H04L 5/0053; H04L 25/0224; H04L 5/001; H04L 5/0094; H04L 27/261
USPC .......... 455/522, 226.1, 423, 67.11, 127.1, 69
See application file for complete search history.

(56) References Cited

U.S. PATENT DOCUMENTS

| | | | | |
|---|---|---|---|---|
| 9,167,535 | B2* | 10/2015 | Christoffersson | H04W 52/146 |
| 9,468,022 | B2* | 10/2016 | Li | H04W 52/146 |
| 10,455,514 | B2* | 10/2019 | Oh | H04W 52/42 |
| 10,939,386 | B2* | 3/2021 | Yao | H04W 52/146 |
| 11,218,206 | B2* | 1/2022 | Yerramalli | H04L 5/0094 |
| 2013/0310103 | A1* | 11/2013 | Madan | H04W 52/386 |
| | | | | 455/522 |
| 2014/0113677 | A1* | 4/2014 | Parkvall | H04W 52/242 |
| | | | | 455/522 |
| 2019/0081675 | A1* | 3/2019 | Jung | H04W 56/001 |
| 2021/0385757 | A1* | 12/2021 | Zhang | H04B 7/0408 |

* cited by examiner

Spatial RS
Activated For
Pathloss
Estimation

USING A SPATIAL REFERENCE SIGNAL FOR PATHLOSS DETERMINATION

CROSS REFERENCE

The present Application for Patent claims the benefit of U.S. Provisional Patent Application No. 62/858,235 by RYU et al., entitled "USING A SPATIAL REFERENCE SIGNAL FOR PATHLOSS DETERMINATION," filed Jun. 6, 2019, assigned to the assignee hereof, and expressly incorporated by reference herein.

INTRODUCTION

The following relates generally to wireless communications, and more specifically to using a reference signal to identify reductions in power density of an uplink transmission.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method of wireless communication at a UE is described. The method may include transmitting, to a base station, a configuration signal indicating that the UE supports using a spatial reference signal for a channel performance measurement procedure, receiving an activation signal from the base station activating the spatial reference signal for the channel performance measurement procedure, receiving the spatial reference signal transmitted by the base station, performing, based on the activation signal, the channel performance measurement procedure using the spatial reference signal transmitted by the base station, where the channel performance measurement procedure includes pathloss estimation of a channel, selecting, based on a result of the channel performance measurement procedure, a transmission power for an uplink transmission to the base station, and performing the uplink transmission to the base station based on the transmission power.

An apparatus for wireless communication at a UE is described. The apparatus may include a processor, memory coupled with the processor, and instructions stored in the memory. The instructions may be executable by the processor to cause the apparatus to transmit, to a base station, a configuration signal indicating that the UE supports using a spatial reference signal for a channel performance measurement procedure, receive an activation signal from the base station activating the spatial reference signal for the channel performance measurement procedure, receive the spatial reference signal transmitted by the base station, perform, based on the activation signal, the channel performance measurement procedure using the spatial reference signal transmitted by the base station, where the channel performance measurement procedure includes pathloss estimation of a channel, select, based on a result of the channel performance measurement procedure, a transmission power for an uplink transmission to the base station, and perform the uplink transmission to the base station based on the transmission power.

Another apparatus for wireless communication at a UE is described. The apparatus may include means for transmitting, to a base station, a configuration signal indicating that the UE supports using a spatial reference signal for a channel performance measurement procedure, receiving an activation signal from the base station activating the spatial reference signal for the channel performance measurement procedure, receiving the spatial reference signal transmitted by the base station, performing, based on the activation signal, the channel performance measurement procedure using the spatial reference signal transmitted by the base station, where the channel performance measurement procedure includes pathloss estimation of a channel, selecting, based on a result of the channel performance measurement procedure, a transmission power for an uplink transmission to the base station, and performing the uplink transmission to the base station based on the transmission power.

A non-transitory computer-readable medium storing code for wireless communication at a UE is described. The code may include instructions executable by a processor to transmit, to a base station, a configuration signal indicating that the UE supports using a spatial reference signal for a channel performance measurement procedure, receive an activation signal from the base station activating the spatial reference signal for the channel performance measurement procedure, receive the spatial reference signal transmitted by the base station, perform, based on the activation signal, the channel performance measurement procedure using the spatial reference signal transmitted by the base station, where the channel performance measurement procedure includes pathloss estimation of a channel, select, based on a result of the channel performance measurement procedure, a transmission power for an uplink transmission to the base station, and perform the uplink transmission to the base station based on the transmission power.

In some examples of the method, apparatuses, and non-transitory computer-readable medium described herein, selecting the transmission power may include operations, features, means, or instructions for transmitting a request signal requesting activation of the spatial reference signal for the channel performance measurement procedure, determining that the UE may be configured with a missing power control configuration for the uplink transmission, disabling fractional power control for the uplink transmission, and selecting a default value for a target receive power level at the base station for the uplink transmission.

In some examples of the method, apparatuses, and non-transitory computer-readable medium described herein, selecting the transmission power may include operations, features, means, or instructions for transmitting a request signal requesting activation of the spatial reference signal for the channel performance measurement procedure, determining that the UE may be configured with a partial power control configuration for the uplink transmission, enabling fractional power control for the uplink transmission based on the partial power control configuration, and selecting a value for a target receive power level at the base station for the uplink transmission based on the partial power control configuration.

In some examples of the method, apparatuses, and non-transitory computer-readable medium described herein, selecting the transmission power may include operations, features, means, or instructions for determining that the UE may be configured with a full power control configuration for the uplink transmission, and selecting the transmission power based on the full power control configuration.

Some examples of the method, apparatuses, and non-transitory computer-readable medium described herein may further include operations, features, means, or instructions for identifying, based on the activation signal, a spatial reference signal identifier for the spatial reference signal, where the channel performance measurement procedure may be based on the spatial reference signal identifier.

Some examples of the method, apparatuses, and non-transitory computer-readable medium described herein may further include operations, features, means, or instructions for transmitting a request signal requesting activation of the spatial reference signal for the channel performance measurement procedure, where the activation signal may be received based on the request signal.

In some examples of the method, apparatuses, and non-transitory computer-readable medium described herein, the configuration signal includes a radio resource control (RRC) configuration signal.

In some examples of the method, apparatuses, and non-transitory computer-readable medium described herein, the activation signal includes at least one of a medium access control (MAC) control element (CE), or a RRC signal, or a downlink control information (DCI), or a combination thereof.

In some examples of the method, apparatuses, and non-transitory computer-readable medium described herein, transmitting the configuration signal further includes transmitting the configuration signal in an initial access procedure or handover procedure.

Some examples of the method, apparatuses, and non-transitory computer-readable medium described herein further include receiving a downlink pathloss reference signal from the base station, wherein performing the channel performance measurement procedure is further based at least in part on the downlink pathloss reference signal.

A method of wireless communication at a base station is described. The method may include receiving, from a UE, a configuration signal indicating that the UE supports using a spatial reference signal for a channel performance measurement procedure, transmitting an activation signal to the UE activating the spatial reference signal for the channel performance measurement procedure, transmitting the spatial reference signal, and receiving an uplink transmission from the UE, where the uplink transmission is received based on a channel performance measurement procedure performed based on the spatial reference signal.

An apparatus for wireless communication at a base station is described. The apparatus may include a processor, memory coupled with the processor, and instructions stored in the memory. The instructions may be executable by the processor to cause the apparatus to receive, from a UE, a configuration signal indicating that the UE supports using a spatial reference signal for a channel performance measurement procedure, transmit an activation signal to the UE activating the spatial reference signal for the channel performance measurement procedure, transmit the spatial reference signal, and receive an uplink transmission from the UE, where the uplink transmission is received based on a channel performance measurement procedure performed based on the spatial reference signal.

Another apparatus for wireless communication at a base station is described. The apparatus may include means for receiving, from a UE, a configuration signal indicating that the UE supports using a spatial reference signal for a channel performance measurement procedure, transmitting an activation signal to the UE activating the spatial reference signal for the channel performance measurement procedure, transmitting the spatial reference signal, and receiving an uplink transmission from the UE, where the uplink transmission is received based on a channel performance measurement procedure performed based on the spatial reference signal.

A non-transitory computer-readable medium storing code for wireless communication at a base station is described. The code may include instructions executable by a processor to receive, from a UE, a configuration signal indicating that the UE supports using a spatial reference signal for a channel performance measurement procedure, transmit an activation signal to the UE activating the spatial reference signal for the channel performance measurement procedure, transmit the spatial reference signal, and receive an uplink transmission from the UE, where the uplink transmission is received based on a channel performance measurement procedure performed based on the spatial reference signal.

Some examples of the method, apparatuses, and non-transitory computer-readable medium described herein may further include operations, features, means, or instructions for receiving a request signal from the UE requesting activation of the spatial reference signal for the channel performance measurement procedure, where the activation may be transmitted based on the request signal.

Some examples of the method, apparatuses, and non-transitory computer-readable medium described herein may further include operations, features, means, or instructions for configuring the UE with at least one of a missing power control configuration, or partial power control configuration, or a full power control configuration.

In some examples of the method, apparatuses, and non-transitory computer-readable medium described herein, the configuration signal includes a RRC configuration signal.

In some examples of the method, apparatuses, and non-transitory computer-readable medium described herein, the activation signal includes at least one of a MAC CE, or a RRC signal, or a DCI, or a combination thereof.

DETAILED DESCRIPTION

Wireless communication systems may support uplink communications (e.g., transmissions from a UE to a base station) and/or downlink communications (e.g., transmissions from a base station to a UE). For uplink communications, the UE may select a transmission power for the uplink transmissions (e.g., for a sounding reference signal (SRS) transmission, a physical uplink control channel (PUCCH) transmission, and/or a physical uplink shared channel (PUSCH) transmission). In some aspects, the transmission power selection for the uplink transmission may be based, at least in some aspects, on the pathloss for the channel between the UE and the base station. The pathloss may be determined or otherwise estimated based on a downlink pathloss reference signal transmitted from the base station (e.g., a SSB, a CSI-RS, and the like). These downlink pathloss reference signals used for pathloss estimation may be configured via RRC signaling, which increases overhead.

Aspects of the disclosure are initially described in the context of a wireless communication system. Broadly, aspects of the described techniques provide a mechanism to configure a non-pathloss reference signal for pathloss estimation with reduced overhead. In some aspects, this may include the UE using a spatial reference signal (e.g., a beamformed reference signal transmitted by the base station that may be used for beam/position management) to perform a channel performance measurement procedure (e.g., for pathloss estimation) for an uplink transmission to the base station. For example, the UE may transmit or otherwise provide a configuration signal (e.g., a capability configuration) to the base station that carries or otherwise conveys an indication that the UE supports using the spatial reference signal for the channel performance measurement procedure. For example, the UE may transmit the configuration signal to the base station during initial access, handover, and the like. The base station may transmit or otherwise provide an activation signal to the UE activating the spatial reference signal for the channel performance measurement procedure. The UE may perform the channel performance measurement procedure (e.g., the pathloss estimation of the channel) using the spatial reference signal. The UE may select a transmission power and then perform the uplink transmission to the base station according to the selected transmission power.

Aspects of the disclosure are further illustrated by and described with reference to apparatus diagrams, system diagrams, and flowcharts that relate to using spatial reference signal for pathloss determination.

Figure 1:
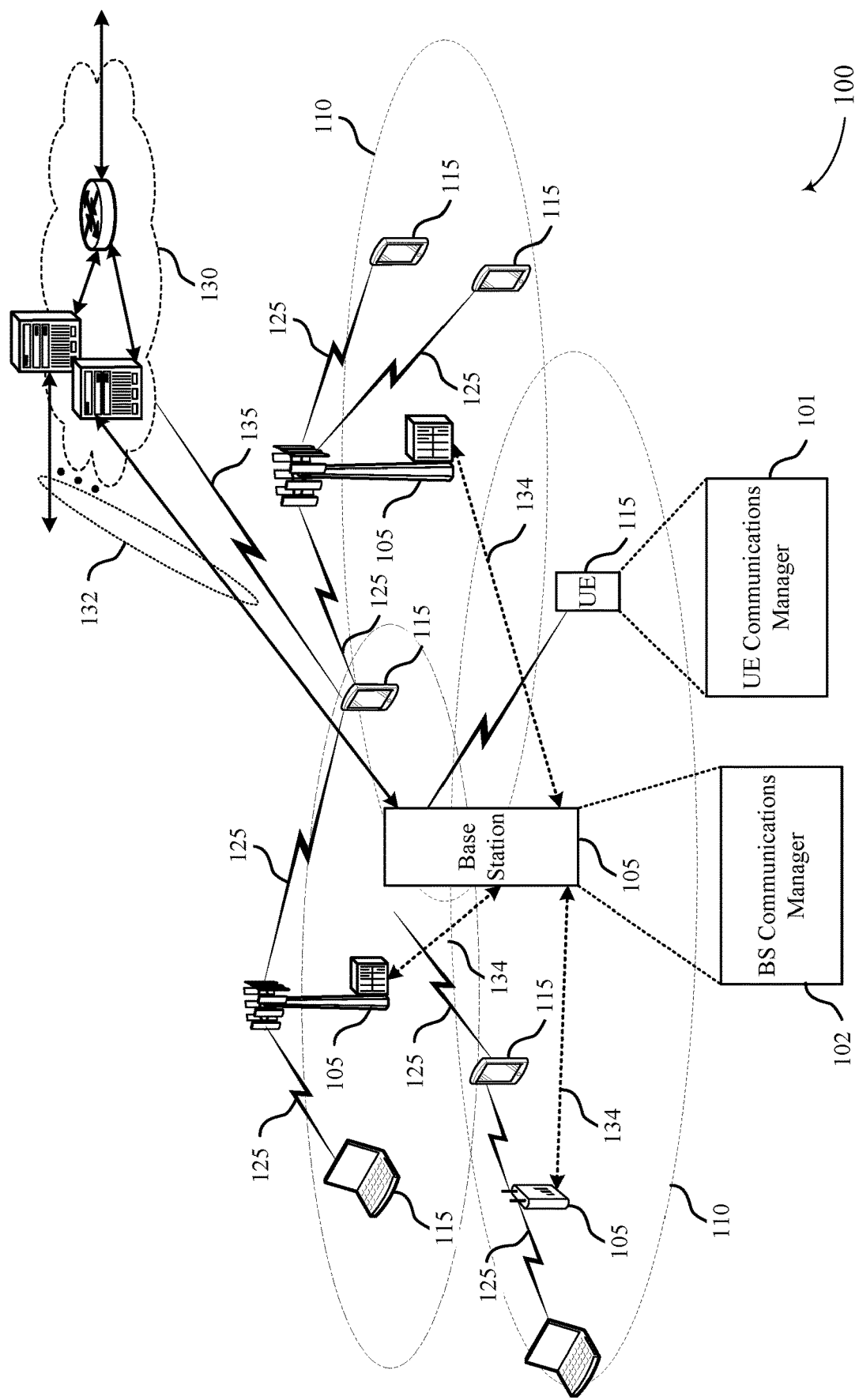
FIG. 1 illustrates an example of a system for wireless communications that supports using spatial reference signal for pathloss determination, in accordance with one or more aspects of the present disclosure.

FIG. 1 illustrates an example of a wireless communication system 100 that supports using spatial reference signal for pathloss determination, in accordance with one or more aspects of the present disclosure. The wireless communication system 100 includes base stations 105, UEs 115, and a core network 130. In some examples, the wireless communication system 100 may be a LTE network, an LTE-A network, an LTE-A Pro network, or a NR network. In some cases, wireless communication system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communication system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communication system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communication system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communication system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communication system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communication system 100 may also operate in an extremely high frequency (EHF) region of the spectrum (e.g., from 30 GHz to 300 GHz), also known as the millimeter band. In some examples, wireless communication system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communication system 100 may utilize both licensed and unlicensed radio frequency spectrum bands. For example, wireless communication system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communication system 100, and may be referred to as a transmission time interval (TTI). In other cases, a smallest scheduling unit of the wireless communication system 100 may be shorter than a subframe or may be dynamically selected (e.g., in bursts of shortened TTIs (sTTIs) or in selected component carriers using sTTIs).

In some wireless communication systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communication systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-S-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communication system 100 (e.g., base stations 105 or UEs 115) may have a hardware configuration that supports communications over a particular carrier bandwidth, or may be configurable to support communications over one of a set of carrier bandwidths. In some examples, the wireless communication system 100 may include base stations 105 and/or UEs 115 that support simultaneous communications via carriers associated with more than one different carrier bandwidth.

Wireless communication system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communication system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communication system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

One or more of the UEs 115 may include a UE communications manager 101, which may transmit, to a base station 105, a configuration signal indicating that the UE 115 supports using a spatial reference signal for a channel performance measurement procedure. The UE communications manager 101 may receive an activation signal from the base station 105 activating the spatial reference signal for the channel performance measurement procedure. The UE communications manager 101 may perform, based at least in part on the activation signal, the channel performance measurement procedure using the spatial reference signal transmitted by the base station 105, wherein the channel performance measurement procedure comprises pathloss estimation of a channel. The UE communications manager 101 may select, based at least in part on a result of the channel performance measurement procedure, a transmission power for an uplink transmission to the base station 105. The UE communications manager 101 may perform the uplink transmission to the base station 105 based at least in part on the transmission power.

One or more of the base stations 105 may include a base station (BS) communications manager 102, which may receive, from a UE 115, a configuration signal indicating that the UE 115 supports using a spatial reference signal for a channel performance measurement procedure. The BS communications manager 102 may transmit an activation signal to the UE 115 activating the spatial reference signal for the channel performance measurement procedure. The BS communications manager 102 may transmit the spatial reference signal and receive an uplink transmission from the UE 115, wherein the uplink transmission is received based at least in part on a channel performance measurement procedure performed based at least in part on the spatial reference signal.

Figure 2A:
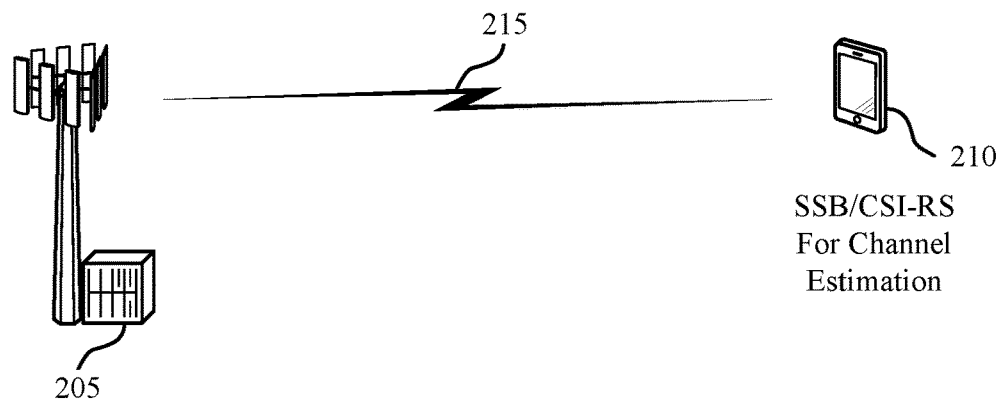
FIGS. 2A and 2B illustrate examples of a wireless communication system that supports using spatial reference signal for pathloss determination, in accordance with one or more aspects of the present disclosure.
Figure 2B:
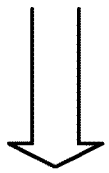
Figure 2B:
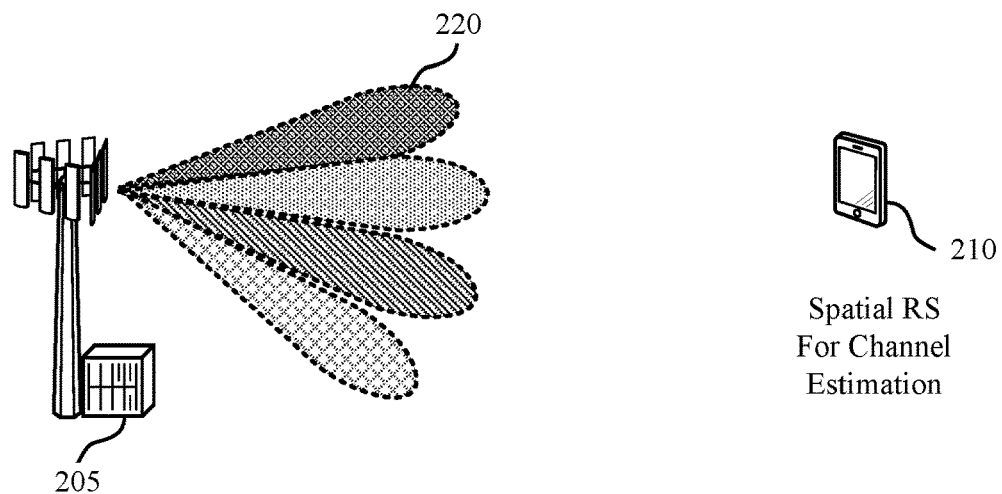

FIGS. 2A and 2B illustrate examples of a wireless communication system 200 that supports using spatial reference signal for pathloss determination, in accordance with one or more aspects of the present disclosure. In some examples, wireless communication system 200 may implement aspects of wireless communication system 100. Wireless communication system 200 may include base station 205 and UE 210, which may be examples of corresponding devices described herein. Specifically, wireless communication system 200-a of FIG. 2A illustrates one example of pathloss estimation using a downlink pathloss reference signal and wireless communication system 200-b of FIG. 2B illustrates one example of pathloss estimation using a spatial reference signal. In some aspects, wireless communication system 200 may be an example of a mmW network.

With reference to FIG. 2A, wireless communication systems, such as wireless communication system 200, may support uplink communications (e.g., transmissions from UE 210 to base station 205) and/or downlink communications (e.g., transmissions from base station 205 to UE 210). For uplink communications, UE 210 may select a transmission power for the uplink transmissions (e.g., for a SRS transmission, a PUCCH transmission, and/or a PUSCH transmission). In some aspects, the transmission power selection for the uplink transmission may be based, at least in some aspects, on the pathloss for a channel between the UE and the base station. In some wireless communication systems, the pathloss may be determined or otherwise estimated based on a downlink pathloss reference signal 215 from base station 205 (e.g., a SSB, a CSI-RS, and the like). The downlink pathloss reference signal 215 used for pathloss estimation may be configured via RRC signaling, which increases overhead, and/or may be transmitted less frequently than spatial reference signal 220. That is, base station 205 may use RRC signaling, a MAC CE, a DCI, etc., to configure the downlink pathloss reference signal 215 for UE 210 to use for performing a channel performance measurement (e.g., pathloss estimation) on the channel between base station 205 and UE 210. Base station 205 may modify or otherwise update aspects of downlink pathloss reference signal 215 on a periodic basis and/or as needed by transmitting additional configuration signaling to UE 210. The downlink pathloss reference signal 215 may be transmitted in a beamformed or in a non-beamformed signal.

Additionally, base station 205 may also configure a spatial reference signal 220 (e.g., beamformed reference signal(s)) for UE 210 to use for maintaining an active beam with base station 205 and/or for location/position tracking. For example, the spatial reference signal 220 may be configured for UE 210 to monitor the performance of the currently active beam pair (e.g., a transmit beam and/or receive beam used by UE 210 for communicating with base station 205) over the channel between base station 205 and UE 210. Examples of the spatial reference signal 220 include, but are not limited to, a beam reference signal (BRS), a beam refinement reference signal (BRRS), a tracking reference signal (TRS), a position reference signal (PRS), and the like. The spatial reference signal 220 may be used by UE 210 to monitor and/or maintain an active beam pair to ensure that UE 210 can receive downlink transmissions from base station 205 (e.g., an active receive beam) and/or perform uplink transmissions to base station 205 (e.g., an active transmit beam). For the uplink transmissions, UE 210 may use the active transmit beam for PUCCH, SRS, etc. That is, UE 210 may monitor spatial reference signal 220 to make sure that a receive beam used to receive the spatial reference signal 220 can be used to identify the transmit beam used for an uplink transmission to base station 205. If UE 210 determines that the spatial reference signal 220 is performing below a threshold level, UE 210 may update the active beam pair to improve communications with base station 205.

Some wireless communication systems configure the downlink pathloss reference signal 215 for pathloss estimation, but rely on the spatial reference signal 220 for beam management and/or position tracking. However, aspects of the described techniques may cause UE 210 to utilize the spatial reference signal 220 of a PUCCH, SRS, etc., to estimate the pathloss for determining the transmission power for PUCCH, SRS, PUSCH, and the like. Use of the spatial reference signal 220 for estimating the pathloss may be triggered by an activation signal from base station 205 activating the spatial reference signal 220 for pathloss estimation. Pathloss estimation may dynamically follow any updates based on the spatial reference signal 220. In some aspects, UE 210 may transmit or otherwise provide an indication of its preference for using spatial reference signal 220 for estimating the pathloss, e.g., in a request signal, which may utilize RRC signaling, a MAC CE, and the like.

Accordingly, UE 210 may transmit or otherwise provide a configuration signal to base station 205 carrying or otherwise convey an indication that UE 210 supports using the spatial reference signal 220 for a channel performance measurement procedure (e.g., for pathloss estimation on the channel between base station 205 and UE 210). The configuration signal may be a part of the initial access procedure between base station 205 and UE 210 (e.g., as part of initial RRC configuration signaling). The configuration signal may be a UE capability signal indicating various operational parameter supported by UE 210. Other configuration signaling may also be used for the configuration signal.

With reference to FIG. 2B, once UE 210 indicates to base station 205 that it supports using the spatial reference signal 220 (with only one spatial reference signal 220 being labeled for ease of reference), base station 205 may transmit or otherwise provide an activation signal to UE 210 activating the spatial reference signal 220 for the channel performance measurement procedure (e.g., for pathloss estimation). That is, in some aspects UE 210 may continue to use downlink pathloss reference signal 215 for pathloss estimation of the channel between base station 205 and UE 210. However, base station 205 may activate or otherwise signal to UE 210 information indicating that the spatial reference signal 220 can be used (e.g., is activated) for pathloss estimation of the channel between base station 205 and UE 210. For example, base station 205 may activate the spatial reference signal 220 for pathloss estimation in response to a number of criteria. One example of the criteria may include UE 210 transmitting a request signal to base station 205 requesting activation of the spatial reference signal 220. Another example of the criteria may include base station 205 activating the spatial reference signal 220 for pathloss estimation based on channel congestion (e.g., to reduce overhead), resource availability (e.g., based on a limited resource availability for configuring/transmitting downlink pathloss reference signal 215 and/or based on available resources for activating/transmitting spatial reference signal 220), and the like.

UE 210 may then use the spatial reference signal 220 to perform the channel performance measurement procedure (e.g., for pathloss estimation of the channel between base station 205 and UE 210). That is, UE 210 may estimate the pathloss of the channel between base station 205 and UE 210 based, at least in some aspects, on the receive power level of spatial reference signal 220, based on a measured throughput rate using the beam corresponding to spatial reference signal 220, based on a measured interference level on the channel, and the like.

In some aspects, each spatial reference signal 220 may have an associated identifier (e.g., a unique index or identifier number associated with the beam, such as a beam index). In some aspects, base station 205 may (e.g., in the activation signal) signal to UE 210 the identifier of the beam corresponding to a particular spatial reference signal 220 for UE 210 to use for pathloss estimation. Accordingly, UE 210 may identify or otherwise determine the identifier of the spatial reference signal 220 and use this information when performing the channel performance measurement procedure.

UE 210 may, based at least in some aspects on the result of the channel performance measurement procedure (e.g., on the estimated pathloss), perform an uplink transmission to base station 205. The uplink transmission may include, but is not limited to, PUCCH, SRS, PUSCH, and the like. That is, UE 210 may select the transmit power level for the uplink transmission based on the measured pathloss on the channel between base station 205 and UE 210. This may avoid UE 210 having to be configured with downlink pathloss reference signal 215 and/or avoid UE 210 having to estimate the path loss using downlink pathloss reference signal 215 and perform beam management using spatial reference signal 220, e.g., conserve resources, minimize configuration signaling, and the like.

In some aspects, UE 210 selecting the transmission power for the uplink transmission may be based on a power control configuration configured by base station 205 for UE 210. Generally, base station 205 may configure UE 210 with a missing power control configuration (e.g., with no power control configuration), with partial power control configuration, or with full power control configuration. Broadly, full power control configuration may include base station 205 configuring UE 210 with the downlink pathloss reference signal 215, with fractional power control (e.g., using an alpha value), with a target receive power level at base station 205 for the uplink transmission, and the like. Partial power control configuration may include base station 205 configuring some, but not all, of the full power control configuration parameters discussed above. A missing power control configuration (e.g., no power control configuration) may include base station 205 not configuring UE 210 with such power control configuration parameters. In some aspects, UE 210 selecting the transmission power for the uplink transmission may be dependent upon which power control configuration that UE 210 is configured with.

As one example where UE 210 determines that it is configured with a missing power control configuration (e.g., with no power control configuration) for the uplink transmission, UE 210 may disable fractional power control for the uplink transmission and select a default value for the target receive power level at base station 205 for the uplink transmission. That is, when there is no power control configuration for an uplink resource (PUSCH/PUCCH/SRS), UE 210 may transmit a request signal requesting activation of the spatial reference signal 220 (e.g., the spatial reference signal 220 of PUCCH and/or SRS) to estimate the pathloss. UE 210 may use the spatial reference signal 220 of the corresponding SRS/PUCCH spatial relation as a pathloss estimation reference signal for PUCCH/PUSCH/SRS. UE 210 may use a default value of "1" for the alpha value to disable fractional power control. UE 210 may use either p0-NominalWithGrant in PUSCH-ConfigCommon for p0 or some other value configured via MAC CE, RRC, etc., to select the default value for the target receive power level at base station 205.

As another example where UE 210 determines that is configured with partial power control configuration for the uplink transmission, UE 210 may enable fractional power control for the uplink transmission and/or select a value for a target receive power level at base station 205 according to the partial power control configuration. That is, UE 210 may transmit a request signal requesting activation of the spatial reference signal 220 for pathloss estimation (e.g., for the channel performance measurement procedure) and enable fractional power control according to the partial power control configuration. That is, if there is partial power control configuration (e.g., at least a pathloss estimation reference signal unspecified) for an uplink resource, UE 210 may use the spatial reference signal 220 (of PUCCH/SRS) to estimate the pathloss. In some aspects, UE 210 being configured with partial power control configuration may be based on UE 210 transmitting a request signal requesting activation of spatial reference signal 220 for the channel performance measurement procedure (e.g., when UE 210 indicates a preference for using spatial reference signal 220 for estimating the pathloss on the channel between base station 205 and UE 210).

As another example where UE 210 determines that is configured with full power control configuration, UE 210 may select the transmission power based, at least in some aspects, on the full power control configuration. That is, if UE 210 transmits a request signal requesting activation of spatial reference signal 220 for pathloss estimation, UE 210 may use the spatial reference signal 220 (of PUCCH/SRS) to estimate the pathloss (e.g., to perform the channel performance measurement procedure in order to select the transmission power for the uplink transmission). In the situation where UE 210 does not transmit the request signal, UE 210 may use the downlink pathloss reference signal 215 in pathloss estimation as configured in the full power control configuration.

Accordingly, aspects of the described techniques provide various mechanisms by which base station 205 and/or UE 210 may repurpose one or more spatial reference signal(s) 220 for pathloss estimation on the channel between base station 205 and UE 210. This may avoid configuring the downlink pathloss reference signal 215 (in some examples), reduce overhead, increase the ability for base station 205 and/or UE 210 to monitor the pathloss on the channel, and the like.

Figure 3:
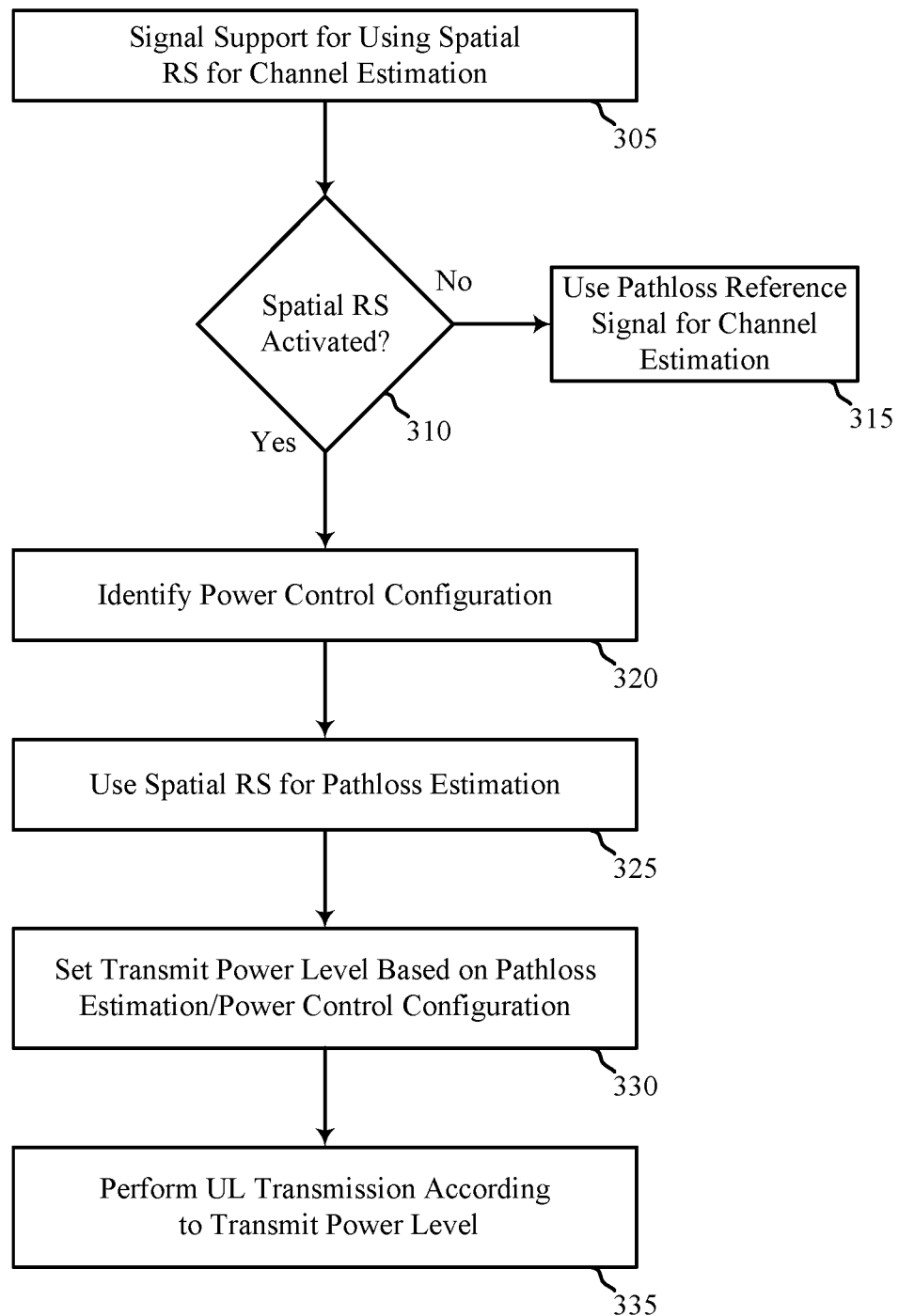
FIG. 3 illustrates an example of a flowchart that supports using spatial reference signal for pathloss determination, in accordance with one or more aspects of the present disclosure.

FIG. 3 illustrates an example of a flowchart 300 that supports using spatial reference signal for pathloss determination, in accordance with one or more aspects of the present disclosure. In some examples, flowchart 300 may implement aspects of wireless communication systems 100 and/or 200. Aspects of flowchart 300 may be implemented by a UE, which may be an example of corresponding devices described herein.

At 305, the UE may transmit or otherwise provide information to a base station signaling its support for using a spatial reference signal for channel estimation (e.g., for a channel performance measurement procedure) of a channel between the UE and a base station. In some aspects, the spatial reference signal may refer to a beamformed signal transmitted from the base station that is, at least conventionally, used for beam management and/or location/position tracking by the UE and/or base station. In some aspects, the UE may signal that support as part of an initial access procedure, a handover, etc. The configuration signal may include, but is not limited to, and RRC configuration signal, a MAC CE, and the like, transmitted from the UE to the base station.

In some aspects, the UE may dynamically change its support for using the spatial reference signal for pathloss estimation. For example, the UE may signal support for using the spatial reference signal for pathloss estimation during initial access, handover, etc., but may not request activation of the use of the spatial reference signal for channel estimation until later. Consequently, in some examples the UE may subsequently transmit or otherwise provide a request signal to the base station requesting activation of using the spatial reference signal for pathloss estimation. For example, the UE may request activation of using the spatial reference signal for pathloss estimation based on the congestion level on the channel (e.g., to reduce overhead on the channel), based upon which power control configuration is configured for the UE by the base station, and the like. In some aspects, the UE may request activation for using the spatial reference signal for pathloss estimation to improve its pathloss estimation, e.g., to increase the frequency that the UE performs pathloss estimation. For example, the UE may request activation in order to utilize a downlink pathloss reference signal in addition to the spatial reference signal for pathloss estimation. Of course, the UE may continue to use the spatial reference signal for beam management to maintain an active beam pair for communicating with the base station.

At 310, the UE may determine whether the spatial reference signal has been activated for pathloss estimation. For example, the UE may determine whether an activation signal has been received from the base station that activates the spatial reference signal for the pathloss estimation (e.g., for a channel performance measurement procedure). The activation signal may be received in a MAC CE, an RRC signal, a DCI, and the like.

If the spatial reference signal has not been activated at 310, at 315 the UE may continue to use the downlink pathloss reference signal (e.g., SSB/CSI RS) for channel estimation (e.g., for the channel performance measurement procedure). That is, the UE may use a downlink pathloss reference signal for pathloss estimation to monitor the performance of the channel between the UE and the base station when the spatial reference signal has not been activated for pathloss estimation.

If the spatial reference signal has been activated at 310, at 320 the UE may identify or otherwise determine its power control configuration. For example, the UE may determine whether or not it is been configured with a full power control configuration, a partial power control configuration, or no (e.g., a missing) power control configuration.

At 325, the UE may use the spatial reference signal for pathloss estimation. That is, the UE may perform the channel performance measurement procedure using the spatial reference signal transmitted by the base station (e.g., for pathloss estimation of the channel between the UE and a base station).

At 330, the UE may set, select, or otherwise identify a transmission power (e.g., transmit power) for an uplink transmission to the base station based on the pathloss estimation and/or power control configuration that has been configured for the UE. In the example where a missing (e.g., no) power control configuration is configured for the UE, the UE may disable fractional power control and/or select a default value for a target receive power level of the uplink transmission at the base station. In the example where partial power control configuration is configured for the UE, the UE may enable fractional power control and/or select the target receive power level for the uplink transmission at the base station according to the partial power control configuration. And finally where the UE is configured with full power control, the UE may select the transmission power level for the uplink transmission according to the full power control configuration, e.g., based on the spatial reference signal and/or a downlink pathloss reference signal, as configured in the full power control configuration.

At 335, the UE may perform the uplink transmission to the base station according to the transmission power selected at 330. The uplink transmission may include, but is not limited to, PUCCH, PUSCH, SRS, and the like. The base station may receive the uplink transmission at or around the target receive power level.

Figure 4:
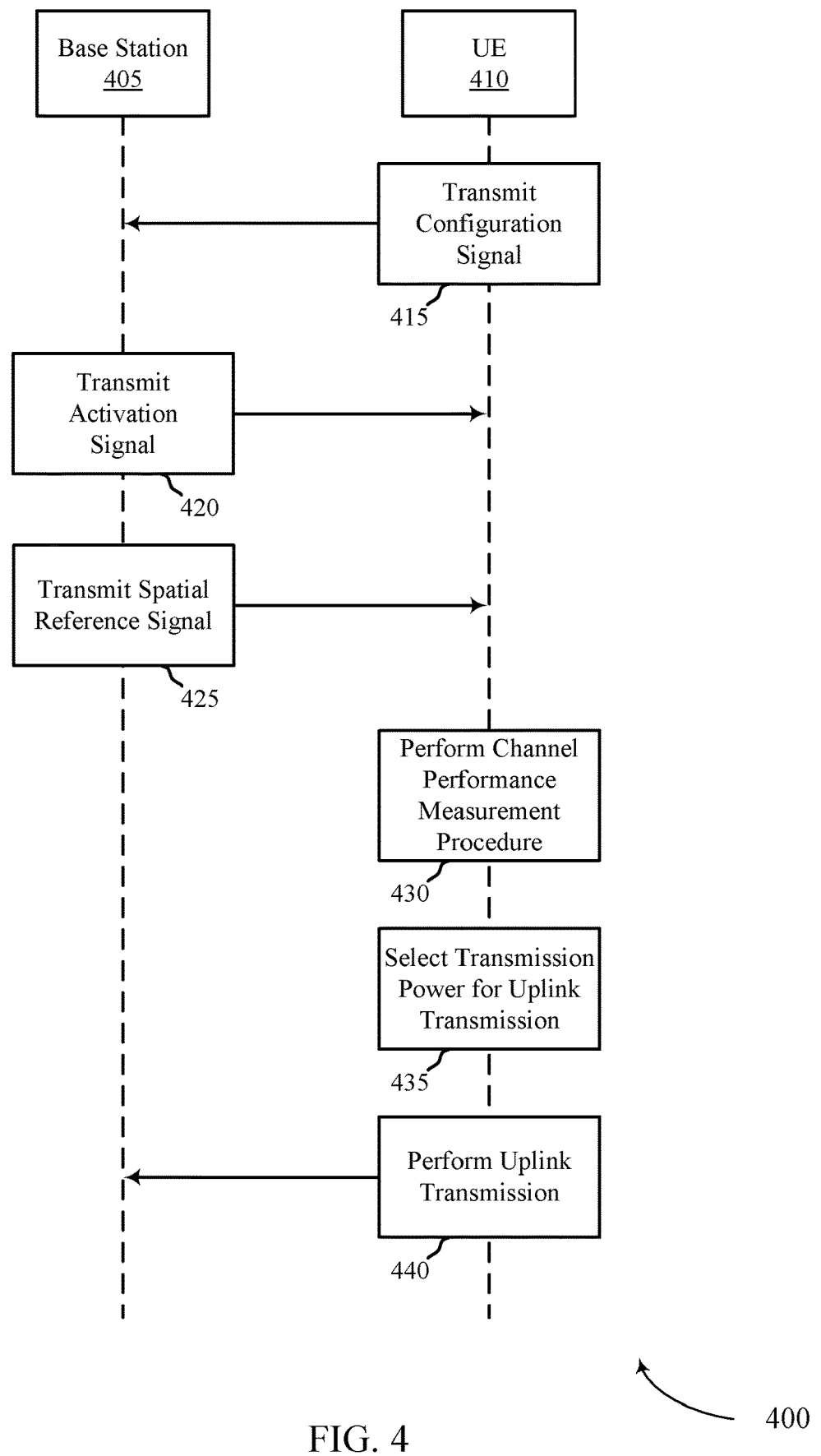
FIG. 4 illustrates an example of a process that supports using spatial reference signal for pathloss determination, in accordance with one or more aspects of the present disclosure.

FIG. 4 illustrates an example of a process 400 that supports using spatial reference signal for pathloss determination, in accordance with one or more aspects of the present disclosure. In some examples, process 400 may implement aspects of wireless communication systems 100, 200, and/or flowchart 300. Aspects of process 400 may be implemented by base station 405 and/or UE 410, which may be examples of the corresponding devices described herein.

At 415, UE 410 may transmit (and base station 405 may receive) a configuration signal indicating that UE 410 supports using a spatial reference signal for a channel performance measurement procedure. In some aspects, the configuration signal may be an RRC signal, a MAC CE signal, a DCI, and the like. In some aspects, the configuration signal may be transmitted upon initial access (e.g., in an RRC initial configuration/reconfiguration signal).

At 420, base station 405 may transmit (and UE 410 may receive) an activation signal activating the spatial reference signal for the channel performance measurement procedure. In some aspects, this may include UE 410 transmitting (and base station 405 receiving) a request signal requesting activation of the spatial reference signal for the channel performance measurement procedure. Base station 405 may transmit (and UE 410 may receive) the activation signal based on the request signal. Examples of the activation signal include, but are not limited to, a MAC CE, an RRC signal, a DCI, and the like.

At 425, base station 405 may transmit (and UE 410 may receive) one or more spatial reference signals. In some aspects, this may include UE 410 identifying, based on the activation signal, an identifier for the spatial reference signal. The channel performance measurement procedure may be performed based on the identifier for the spatial reference signal. In some aspects, the spatial reference signal may refer to any beamformed signal transmitted by a base station 405 that is configured to be used for beam management and/or location/position tracking by UE 410. Examples of the spatial reference signal include, but are not limited to, BRS, BRRS, a TRS, PRS, and the like.

At 430, UE 410 may perform, based at least in part on the activation signal, the channel performance measurement procedure using the spatial reference signal transmitted by a base station 405. In some aspects, the channel performance measurement procedure may include pathloss estimation for the channel between base station 405 and UE 410. In some aspects, the channel performance measurement procedure may include the UE 410 estimating or otherwise determining the pathloss for the channel between base station 405 and UE 410. Depending upon which power control configuration that UE 410 is configured with, the channel performance measurement procedure may be performed based on the spatial reference signal and/or one or more downlink pathloss reference signals configured by base station 405 for UE 410.

At 435, UE 410 may select, based at least in part on a result of the channel performance measurement procedure, the transmission power for an uplink transmission to base station 405. In some aspects, the selected transmission power may be based on a target receive power level for the uplink transmission at base station 405.

In some aspects, this may include UE 410 transmitting (and base station 405 receiving) a request signal requesting activation of the spatial reference signal for the channel performance measurement procedure. UE 410 may determine that it is configured with no power control configuration (e.g., a missing power control configuration) for the uplink transmission and, therefore, disable fractional power control for the uplink transmission and/or select a default value for a target receive power level at base station 405 for the uplink transmission.

In some aspects, this may include UE 410 transmitting (and base station 405 receiving) a request signal requesting activation of the spatial reference signal for the channel performance measurement procedure. UE 410 may determine that it is configured with partial power control configuration for the uplink transmission and, therefore, enable fractional power control for the uplink transmission and/or select a value for the target receive power level at base station 405 for the uplink transmission based on the partial power control configuration.

In some aspects, this may include UE 410 determining that it is configured with a full power control configuration for the uplink transmission. In this context, UE 410 may select the transmission power for the uplink transmission based on the full power control configuration.

At 440, UE 410 may perform (e.g., transmit, and base station 405 may receive) the uplink transmission based at least in part on the selected transmission power. Generally, the uplink transmission may include, but is not limited to, PUCCH, SRS, PUSCH, and the like. Base station 405 may receive the uplink transmission at (or within a defined range) of the target receive power level.

Figure 5:
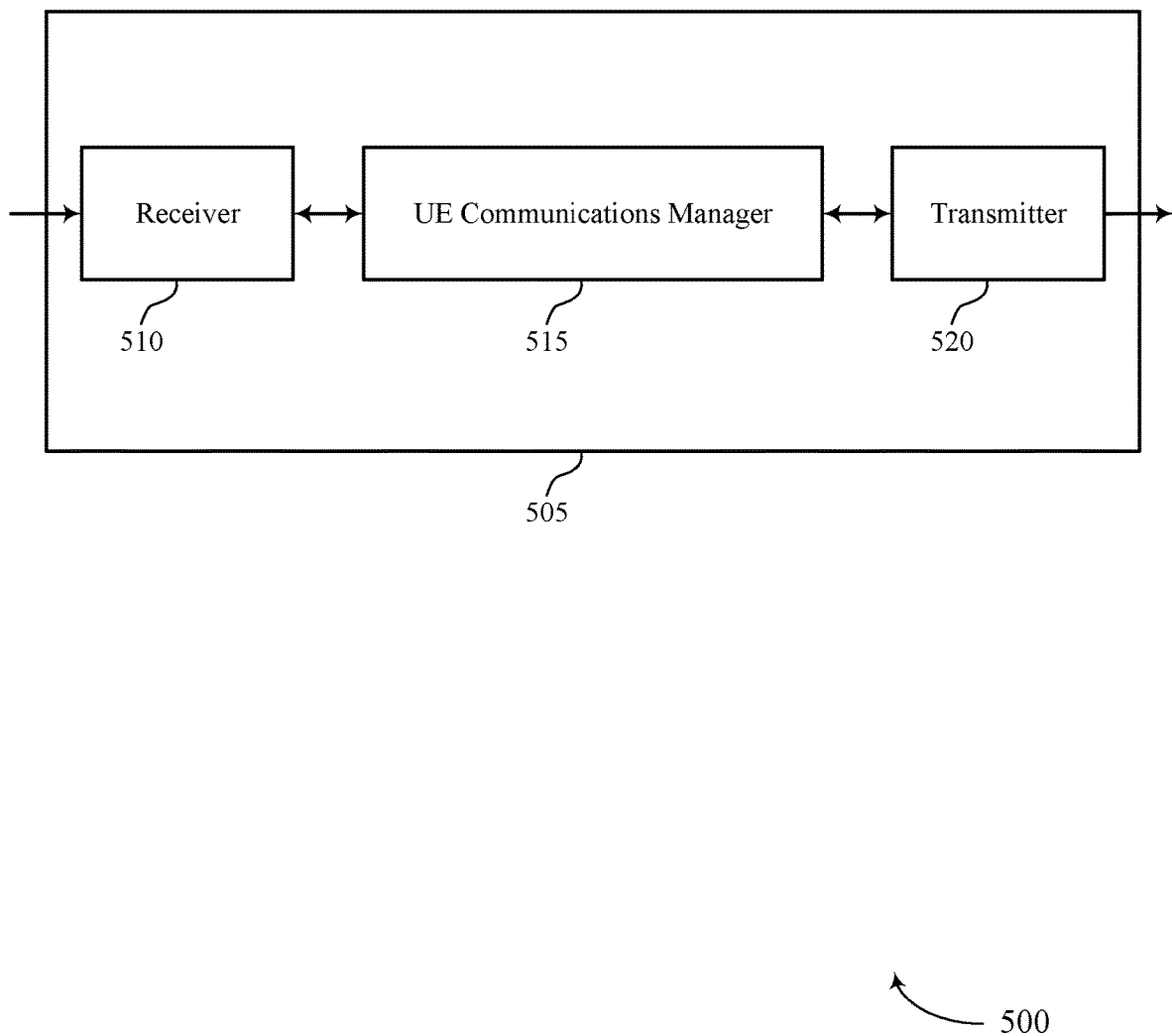
FIGS. 5 and 6 show block diagrams of devices that support using spatial reference signal for pathloss determination, in accordance with one or more aspects of the present disclosure.

FIG. 5 shows a block diagram 500 of a device 505 that supports using spatial reference signal for pathloss determination, in accordance with one or more aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to using spatial reference signal for pathloss determination, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may transmit, to a base station, a configuration signal indicating that the UE supports using a spatial reference signal for a channel performance measurement procedure, receive an activation signal from the base station activating the spatial reference signal for the channel performance measurement procedure, receive the spatial reference signal transmitted by the base station, perform, based on the activation signal, the channel performance measurement procedure using the spatial reference signal transmitted by the base station, where the channel performance measurement procedure includes pathloss estimation of a channel, select, based on a result of the channel performance measurement procedure, a transmission power for an uplink transmission to the base station, and perform the uplink transmission to the base station based on the transmission power. The UE communications manager 515 may be an example of aspects of the UE communications manager 810 described herein.

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
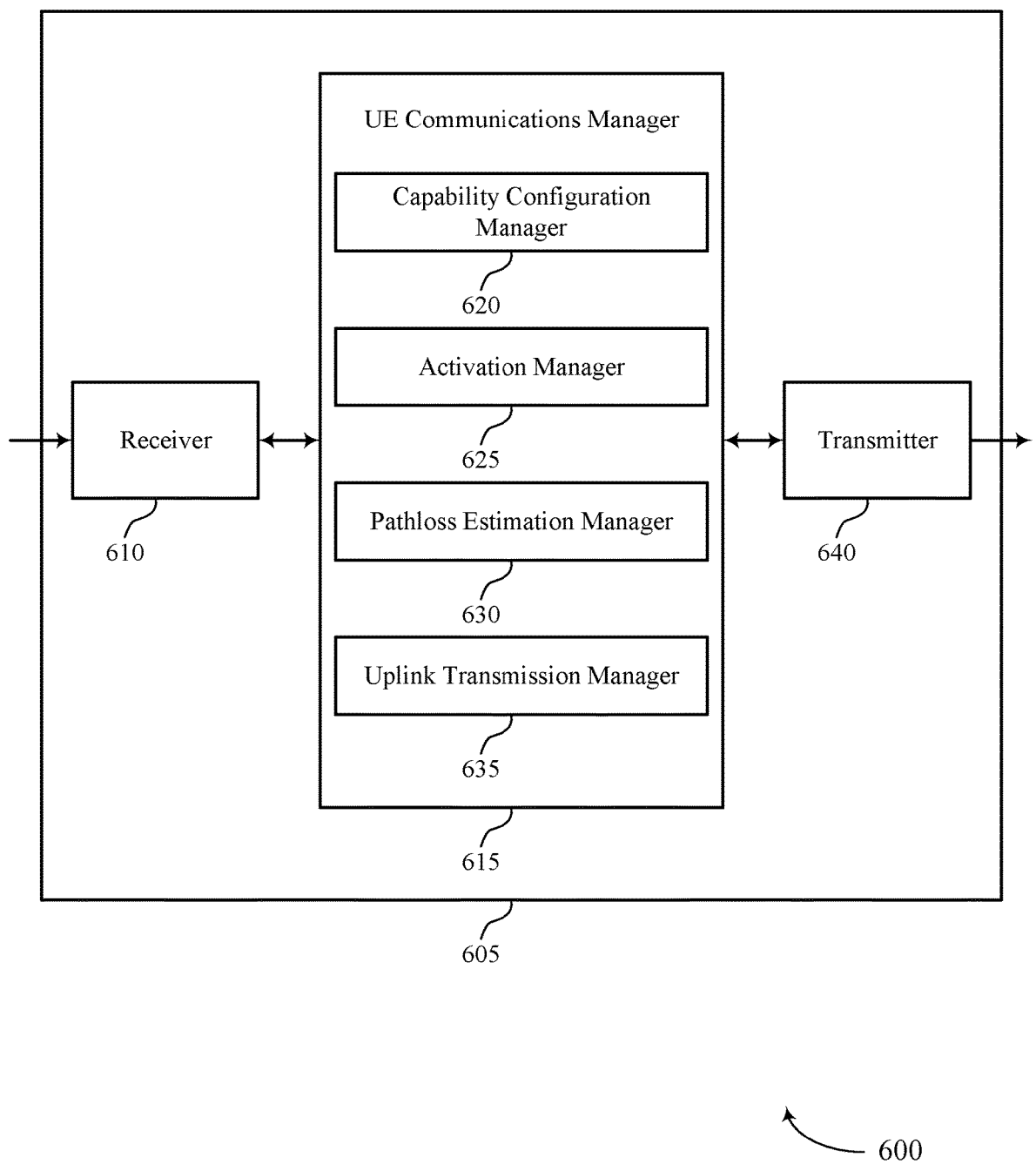

FIG. 6 shows a block diagram 600 of a device 605 that supports using spatial reference signal for pathloss determination, in accordance with one or more aspects of the present disclosure. The device 605 may be an example of aspects of a device 505, or a UE 115 as described herein. The device 605 may include a receiver 610, a UE communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to using spatial reference signal for pathloss determination, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a capability configuration manager 620, an activation manager 625, a pathloss estimation manager 630, and an uplink transmission manager 635. The UE communications manager 615 may be an example of aspects of the UE communications manager 810 described herein.

The capability configuration manager 620 may transmit, to a base station, a configuration signal indicating that the UE supports using a spatial reference signal for a channel performance measurement procedure.

The activation manager 625 may receive an activation signal from the base station activating the spatial reference signal for the channel performance measurement procedure.

The pathloss estimation manager 630 may receive the spatial reference signal transmitted by the base station and perform, based on the activation signal, the channel performance measurement procedure using the spatial reference signal transmitted by the base station, where the channel performance measurement procedure includes pathloss estimation of a channel.

The uplink transmission manager 635 may select, based on a result of the channel performance measurement procedure, a transmission power for an uplink transmission to the base station and perform the uplink transmission to the base station based on the transmission power.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
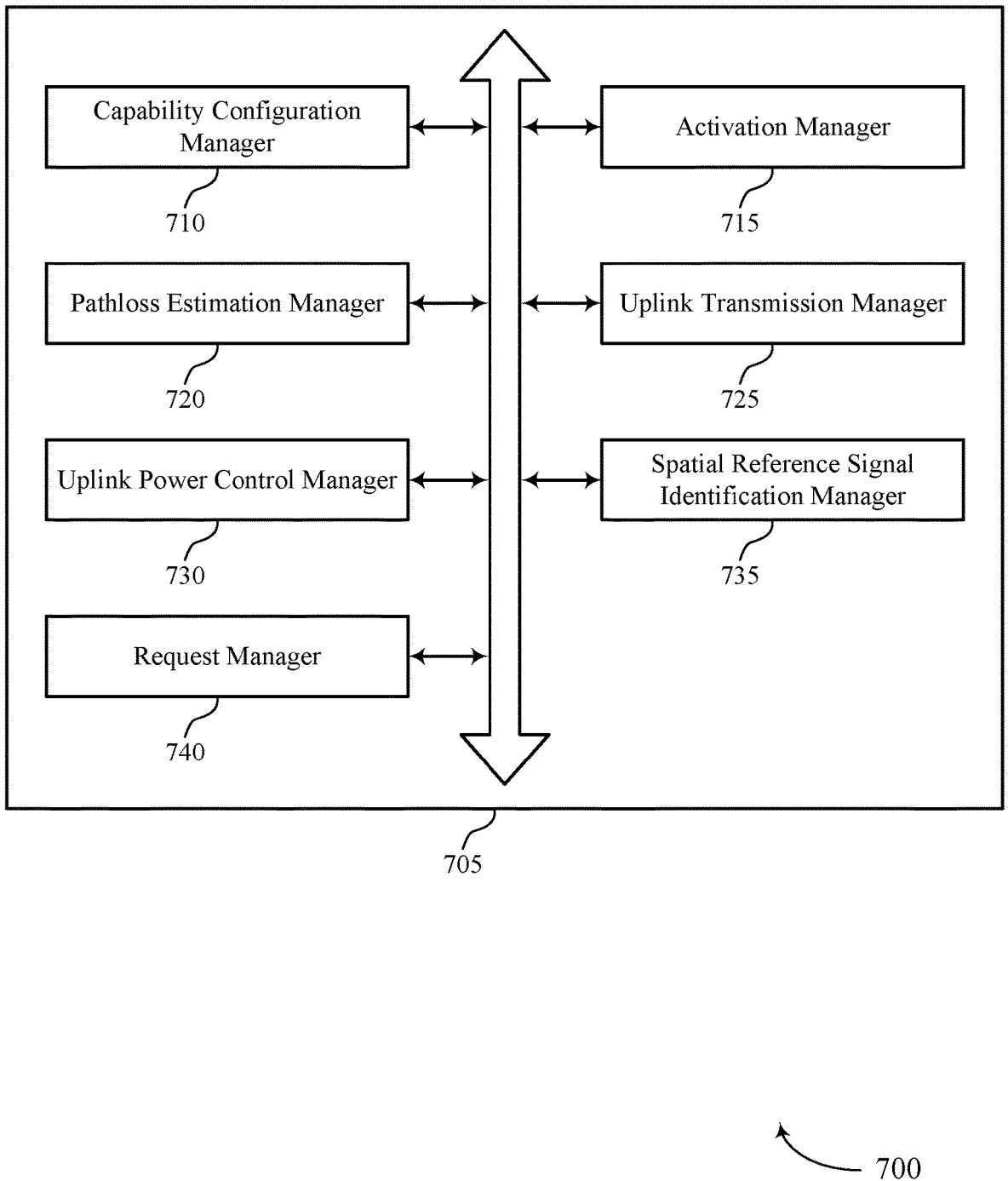
FIG. 7 shows a block diagram of a communications manager that supports using spatial reference signal for pathloss determination, in accordance with one or more aspects of the present disclosure.

FIG. 7 shows a block diagram 700 of a UE communications manager 705 that supports using spatial reference signal for pathloss determination, in accordance with one or more aspects of the present disclosure. The UE communications manager 705 may be an example of aspects of a UE communications manager 515, a UE communications manager 615, or a UE communications manager 810 described herein. The UE communications manager 705 may include a capability configuration manager 710, an activation manager 715, a pathloss estimation manager 720, an uplink transmission manager 725, an uplink power control manager 730, a spatial reference signal identification manager 735, and a request manager 740. Each of these modules may communicate, directly or indirectly, with one another (e.g., via one or more buses).

The capability configuration manager 710 may transmit, to a base station, a configuration signal indicating that the UE supports using a spatial reference signal for a channel performance measurement procedure.

In some cases, the configuration signal includes a RRC configuration signal.

The activation manager 715 may receive an activation signal from the base station activating the spatial reference signal for the channel performance measurement procedure.

In some cases, the activation signal includes at least one of a MAC CE, or a RRC signal, or a DCI, or a combination thereof.

The pathloss estimation manager 720 may receive the spatial reference signal transmitted by the base station.

In some examples, performing, based on the activation signal, the channel performance measurement procedure using the spatial reference signal transmitted by the base station, where the channel performance measurement procedure includes pathloss estimation of a channel.

The uplink transmission manager 725 may select, based on a result of the channel performance measurement procedure, a transmission power for an uplink transmission to the base station.

In some examples, the uplink transmission manager 725 may perform the uplink transmission to the base station based on the transmission power.

The uplink power control manager 730 may transmit a request signal requesting activation of the spatial reference signal for the channel performance measurement procedure.

In some examples, the uplink power control manager 730 may determine that the UE is configured with a missing power control configuration for the uplink transmission.

In some examples, the uplink power control manager 730 may disable fractional power control for the uplink transmission.

In some examples, the uplink power control manager 730 may select a default value for a target receive power level at the base station for the uplink transmission.

In some examples, the uplink power control manager 730 may determine that the UE is configured with a partial power control configuration for the uplink transmission.

In some examples, the uplink power control manager 730 may enable fractional power control for the uplink transmission based on the partial power control configuration.

In some examples, the uplink power control manager 730 may select a value for a target receive power level at the base station for the uplink transmission based on the partial power control configuration.

In some examples, the uplink power control manager 730 may determine that the UE is configured with a full power control configuration for the uplink transmission.

In some examples, the uplink power control manager 730 may select the transmission power based on the full power control configuration.

The spatial reference signal identification manager 735 may identify, based on the activation signal, a spatial reference signal identifier for the spatial reference signal, where the channel performance measurement procedure is based on the spatial reference signal identifier.

The request manager 740 may transmit a request signal requesting activation of the spatial reference signal for the channel performance measurement procedure, where the activation signal is received based on the request signal.

Figure 8:
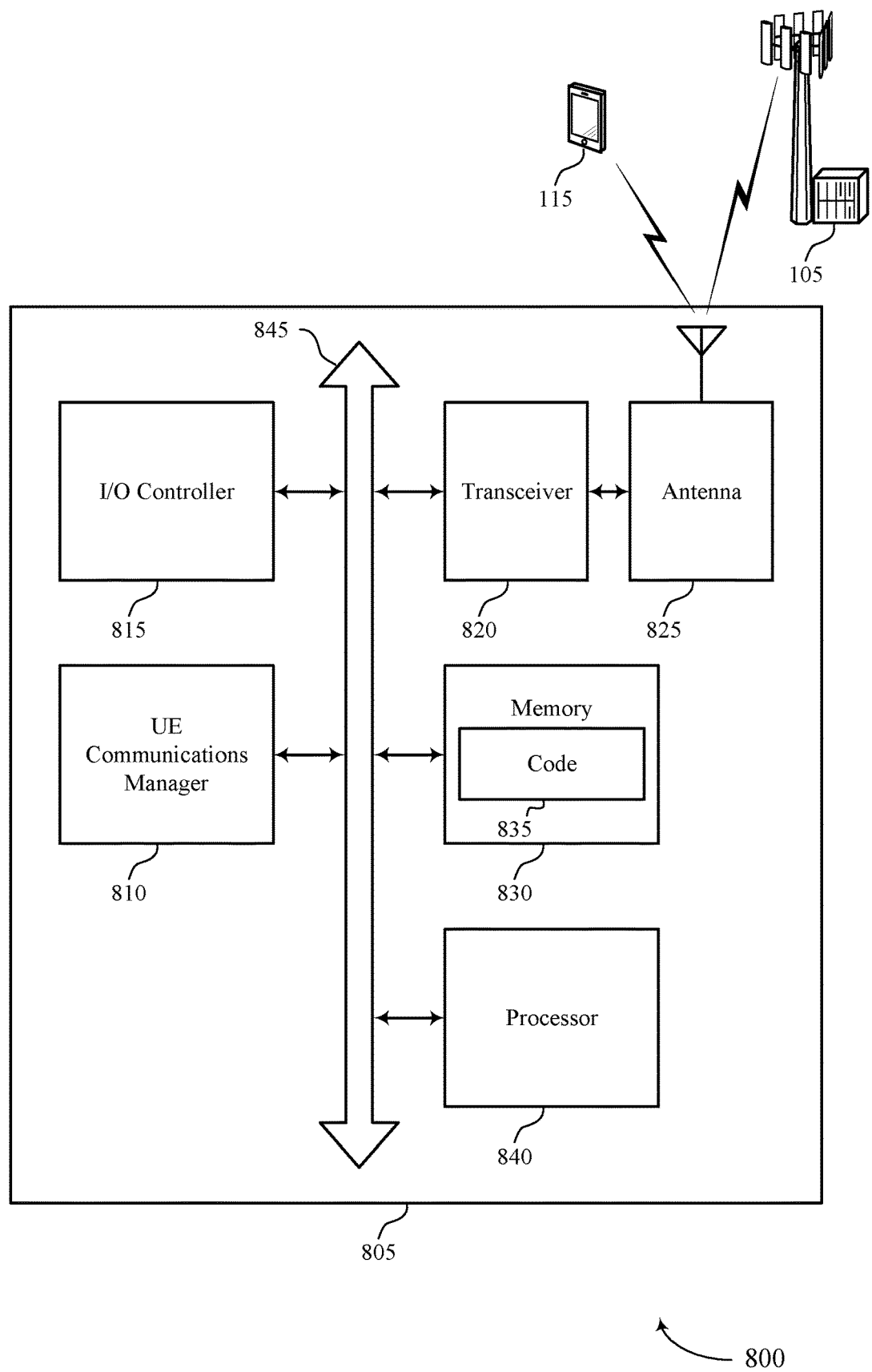
FIG. 8 shows a diagram of a system including a device that supports using spatial reference signal for pathloss determination, in accordance with one or more aspects of the present disclosure.

FIG. 8 shows a diagram of a system 800 including a device 805 that supports using spatial reference signal for pathloss determination, in accordance with one or more aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may transmit, to a base station, a configuration signal indicating that the UE supports using a spatial reference signal for a channel performance measurement procedure, receive an activation signal from the base station activating the spatial reference signal for the channel performance measurement procedure, receive the spatial reference signal transmitted by the base station, perform, based on the activation signal, the channel performance measurement procedure using the spatial reference signal transmitted by the base station, where the channel performance measurement procedure includes pathloss estimation of a channel, select, based on a result of the channel performance measurement procedure, a transmission power for an uplink transmission to the base station, and perform the uplink transmission to the base station based on the transmission power.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include read-only memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting using spatial reference signal for pathloss determination).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
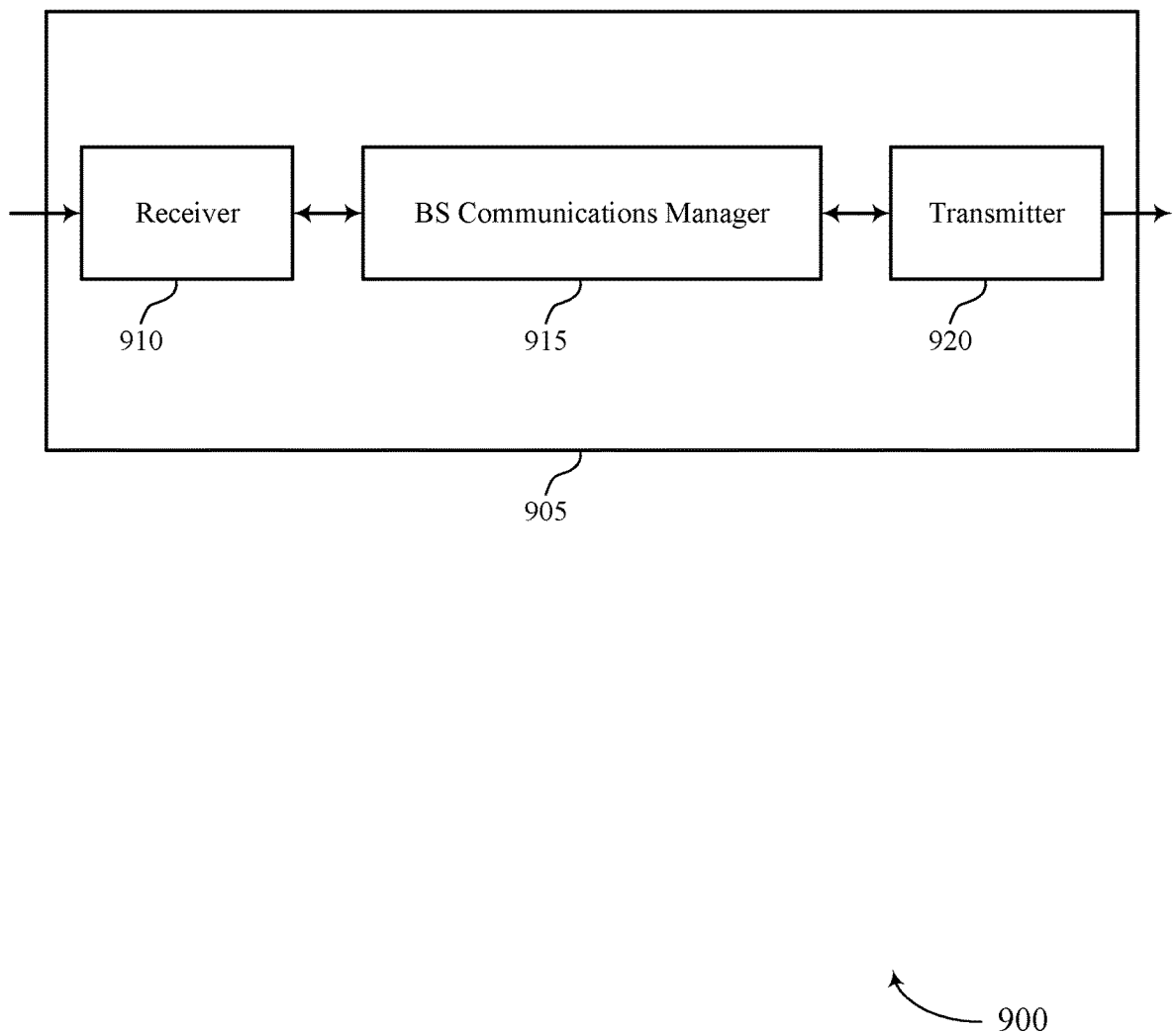
FIGS. 9 and 10 show block diagrams of devices that support using spatial reference signal for pathloss determination, in accordance with one or more aspects of the present disclosure.

FIG. 9 shows a block diagram 900 of a device 905 that supports using spatial reference signal for pathloss determination, in accordance with one or more aspects of the present disclosure. The device 905 may be an example of aspects of a base station 105 as described herein. The device 905 may include a receiver 910, a BS communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to using spatial reference signal for pathloss determination, etc.). Information may be passed on to other components of the device 905. The receiver 910 may be an example of aspects of the transceiver 1220 described with reference to FIG. 12. The receiver 910 may utilize a single antenna or a set of antennas.

The BS communications manager 915 may receive, from a UE, a configuration signal indicating that the UE supports using a spatial reference signal for a channel performance measurement procedure, transmit an activation signal to the UE activating the spatial reference signal for the channel performance measurement procedure, transmit the spatial reference signal, and receive an uplink transmission from the UE, where the uplink transmission is received based on a channel performance measurement procedure performed based on the spatial reference signal. The BS communications manager 915 may be an example of aspects of the BS communications manager 1210 described herein.

The BS communications manager 915, or its sub-components, may be implemented in hardware, code (e.g., software or firmware) executed by a processor, or any combination thereof. If implemented in code executed by a processor, the functions of the BS communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The BS communications manager 915, or its sub-components, may be physically located at various positions, including being distributed such that portions of functions are implemented at different physical locations by one or more physical components. In some examples, the BS communications manager 915, or its sub-components, may be a separate and distinct component in accordance with various aspects of the present disclosure. In some examples, the BS communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
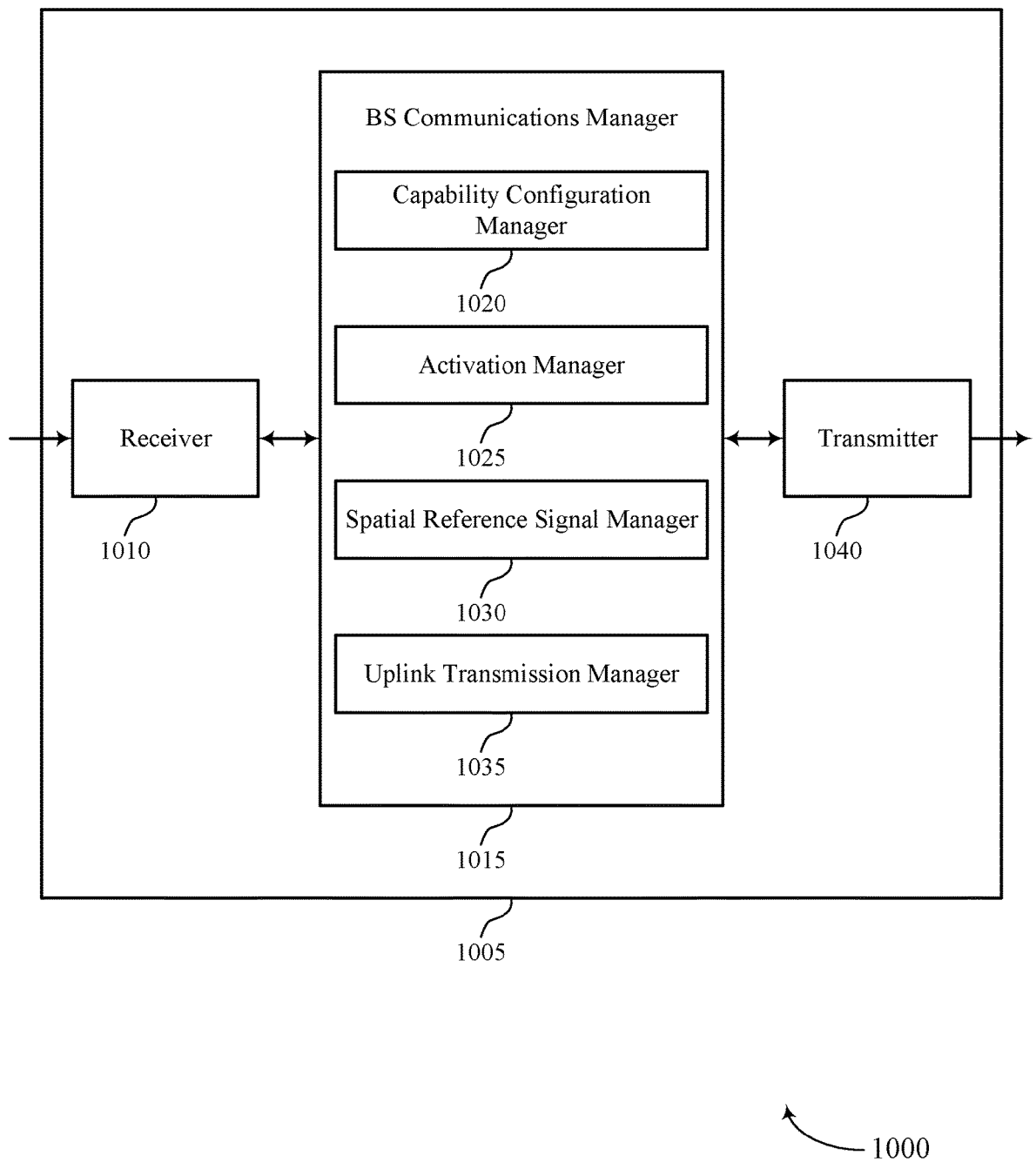

FIG. 10 shows a block diagram 1000 of a device 1005 that supports using spatial reference signal for pathloss determination, in accordance with one or more aspects of the present disclosure. The device 1005 may be an example of aspects of a device 905, or a base station 105 as described herein. The device 1005 may include a receiver 1010, a BS communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to using spatial reference signal for pathloss determination, etc.). Information may be passed on to other components of the device 1005. The receiver 1010 may be an example of aspects of the transceiver 1220 described with reference to FIG. 12. The receiver 1010 may utilize a single antenna or a set of antennas.

The BS communications manager 1015 may be an example of aspects of the BS communications manager 915 as described herein. The BS communications manager 1015 may include a capability configuration manager 1020, an activation manager 1025, a spatial reference signal manager 1030, and an uplink transmission manager 1035. The BS communications manager 1015 may be an example of aspects of the BS communications manager 1210 described herein.

The capability configuration manager 1020 may receive, from a UE, a configuration signal indicating that the UE supports using a spatial reference signal for a channel performance measurement procedure.

The activation manager 1025 may transmit an activation signal to the UE activating the spatial reference signal for the channel performance measurement procedure. The spatial reference signal manager 1030 may transmit the spatial reference signal. The uplink transmission manager 1035 may receive an uplink transmission from the UE, where the uplink transmission is received based on a channel performance measurement procedure performed based on the spatial reference signal.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
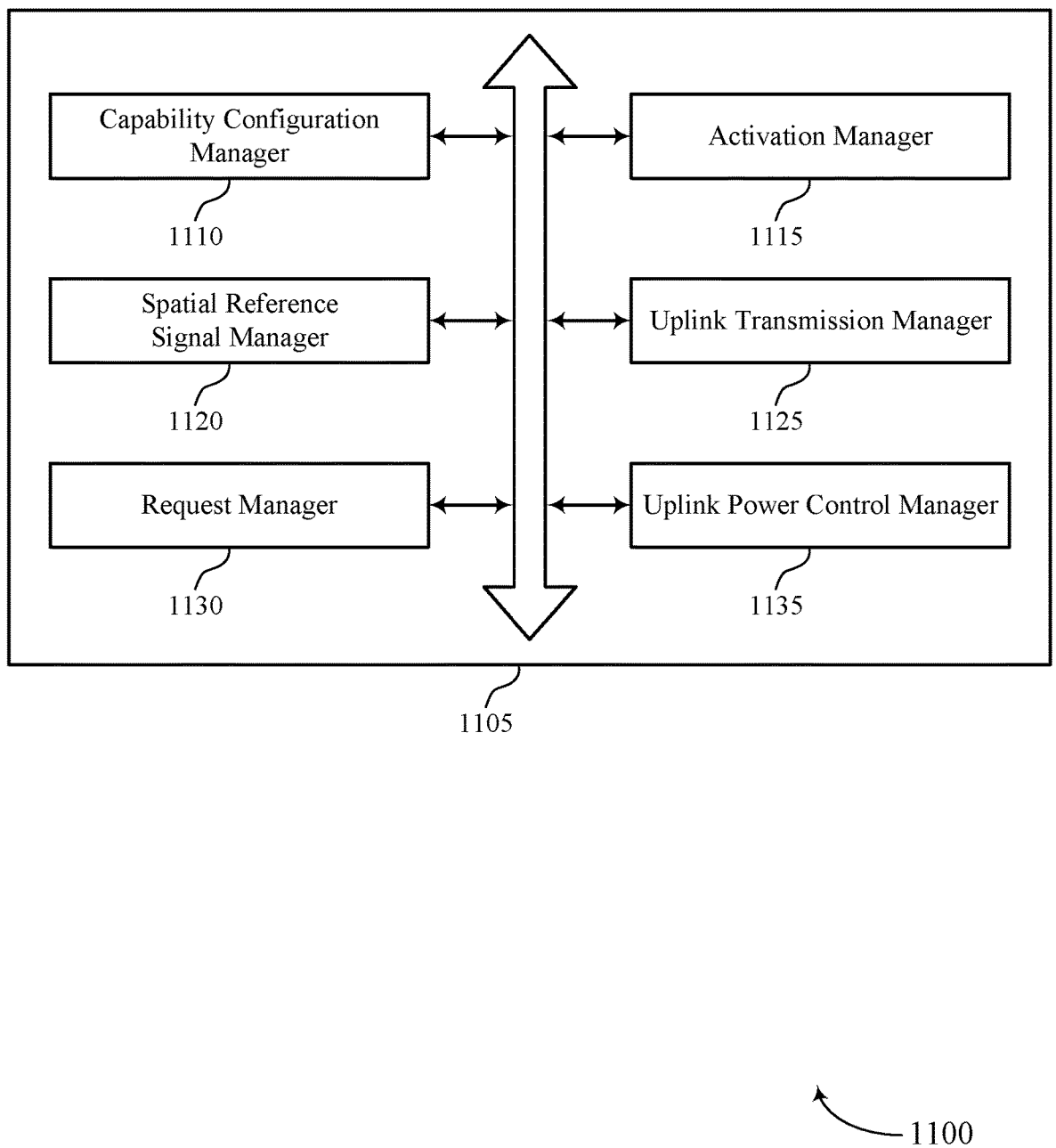
FIG. 11 shows a block diagram of a communications manager that supports using spatial reference signal for pathloss determination, in accordance with one or more aspects of the present disclosure.

FIG. 11 shows a block diagram 1100 of a BS communications manager 1105 that supports using spatial reference signal for pathloss determination, in accordance with one or more aspects of the present disclosure. The BS communications manager 1105 may be an example of aspects of a BS communications manager 915, a BS communications manager 1015, or a BS communications manager 1210 described herein. The BS communications manager 1105 may include a capability configuration manager 1110, an activation manager 1115, a spatial reference signal manager 1120, an uplink transmission manager 1125, a request manager 1130, and an uplink power control manager 1135. Each of these modules may communicate, directly or indirectly, with one another (e.g., via one or more buses).

The capability configuration manager 1110 may receive, from a UE, a configuration signal indicating that the UE supports using a spatial reference signal for a channel performance measurement procedure. In some cases, the configuration signal includes a RRC configuration signal.

The activation manager 1115 may transmit an activation signal to the UE activating the spatial reference signal for the channel performance measurement procedure. In some cases, the activation signal includes at least one of a MAC CE, or a RRC signal, or a DCI, or a combination thereof.

The spatial reference signal manager 1120 may transmit the spatial reference signal.

The uplink transmission manager 1125 may receive an uplink transmission from the UE, where the uplink transmission is received based on a channel performance measurement procedure performed based on the spatial reference signal.

The request manager 1130 may receive a request signal from the UE requesting activation of the spatial reference signal for the channel performance measurement procedure, where the activation is transmitted based on the request signal.

The uplink power control manager 1135 may configure the UE with at least one of a missing power control configuration, or partial power control configuration, or a full power control configuration.

Figure 12:
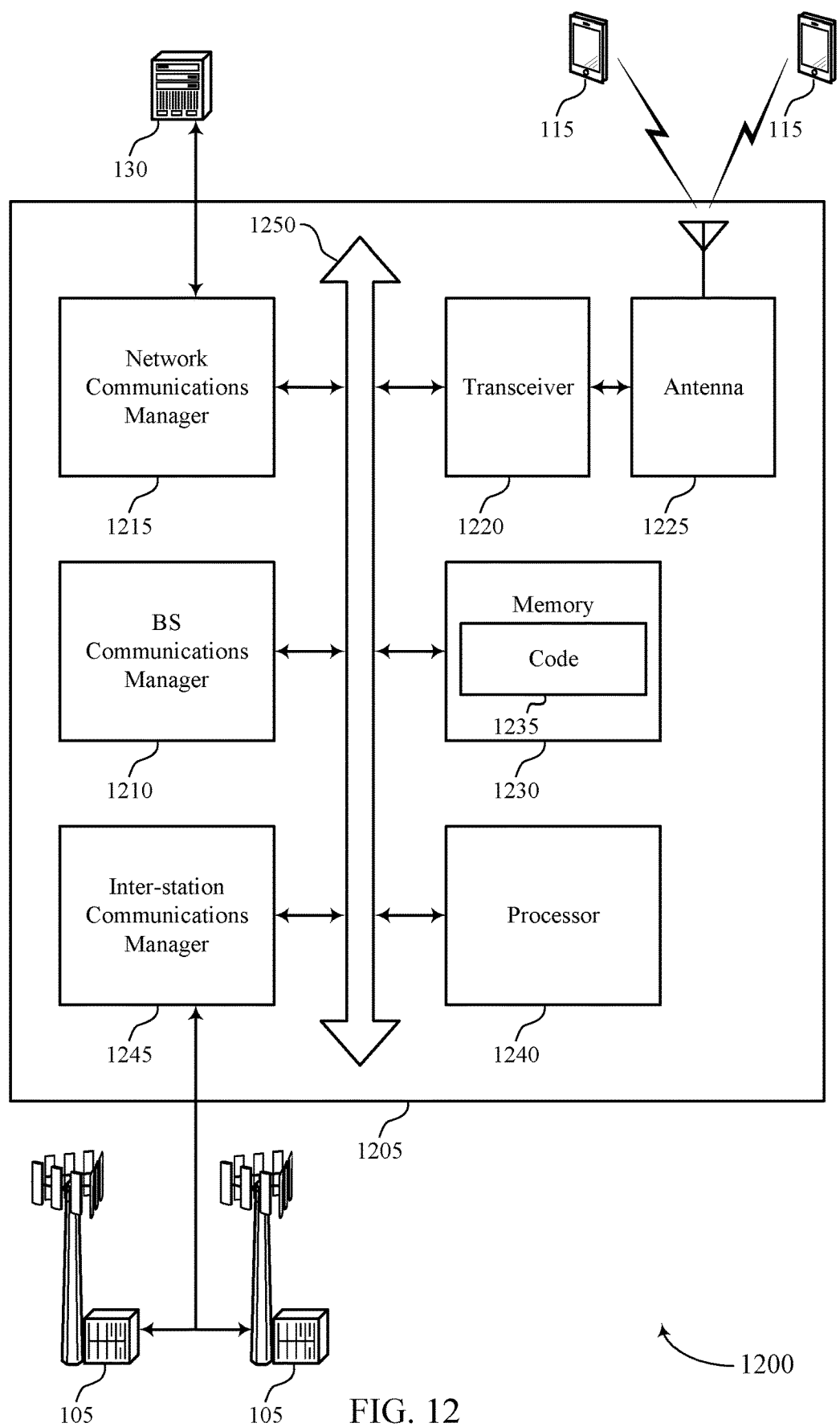
FIG. 12 shows a diagram of a system including a device that supports using spatial reference signal for pathloss determination, in accordance with one or more aspects of the present disclosure.

FIG. 12 shows a diagram of a system 1200 including a device 1205 that supports using spatial reference signal for pathloss determination, in accordance with one or more aspects of the present disclosure. The device 1205 may be an example of or include the components of device 905, device 1005, or a base station 105 as described herein. The device 1205 may include components for bi-directional voice and data communications including components for transmitting and receiving communications, including a BS communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The BS communications manager 1210 may receive, from a UE, a configuration signal indicating that the UE supports using a spatial reference signal for a channel performance measurement procedure, transmit an activation signal to the UE activating the spatial reference signal for the channel performance measurement procedure, transmit the spatial reference signal, and receive an uplink transmission from the UE, where the uplink transmission is received based on a channel performance measurement procedure performed based on the spatial reference signal.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting using spatial reference signal for pathloss determination).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
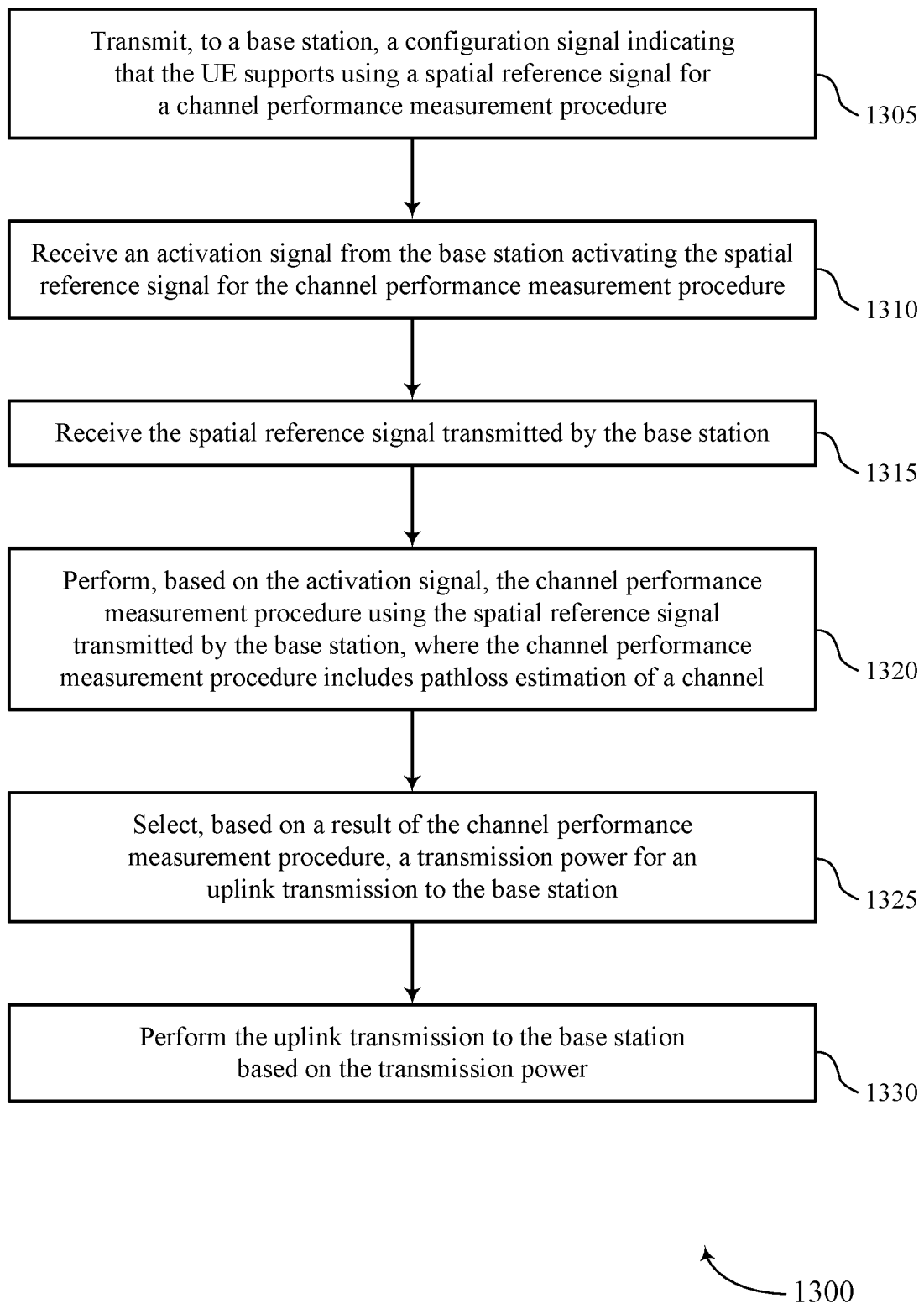
FIGS. 13 through 17 show flowcharts illustrating methods that support using spatial reference signal for pathloss determination, in accordance with one or more aspects of the present disclosure.

FIG. 13 shows a flowchart illustrating a method 1300 that supports using spatial reference signal for pathloss determination, in accordance with one or more aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may transmit, to a base station, a configuration signal indicating that the UE supports using a spatial reference signal for a channel performance measurement procedure. The operations of 1305 may be performed according to the methods described herein. In some examples, aspects of the operations of 1305 may be performed by a capability configuration manager as described with reference to FIGS. 5 through 8.

At 1310, the UE may receive an activation signal from the base station activating the spatial reference signal for the channel performance measurement procedure. The operations of 1310 may be performed according to the methods described herein. In some examples, aspects of the operations of 1310 may be performed by an activation manager as described with reference to FIGS. 5 through 8.

At 1315, the UE may receive the spatial reference signal transmitted by the base station. The operations of 1315 may be performed according to the methods described herein. In some examples, aspects of the operations of 1315 may be performed by a pathloss estimation manager as described with reference to FIGS. 5 through 8.

At 1320, the UE may perform, based on the activation signal, the channel performance measurement procedure using the spatial reference signal transmitted by the base station, where the channel performance measurement procedure includes pathloss estimation of a channel. The operations of 1320 may be performed according to the methods described herein. In some examples, aspects of the operations of 1320 may be performed by a pathloss estimation manager as described with reference to FIGS. 5 through 8.

At 1325, the UE may select, based on a result of the channel performance measurement procedure, a transmission power for an uplink transmission to the base station. The operations of 1325 may be performed according to the methods described herein. In some examples, aspects of the operations of 1325 may be performed by an uplink transmission manager as described with reference to FIGS. 5 through 8.

At 1330, the UE may perform the uplink transmission to the base station based on the transmission power. The operations of 1330 may be performed according to the methods described herein. In some examples, aspects of the operations of 1330 may be performed by an uplink transmission manager as described with reference to FIGS. 5 through 8.

Figure 14:
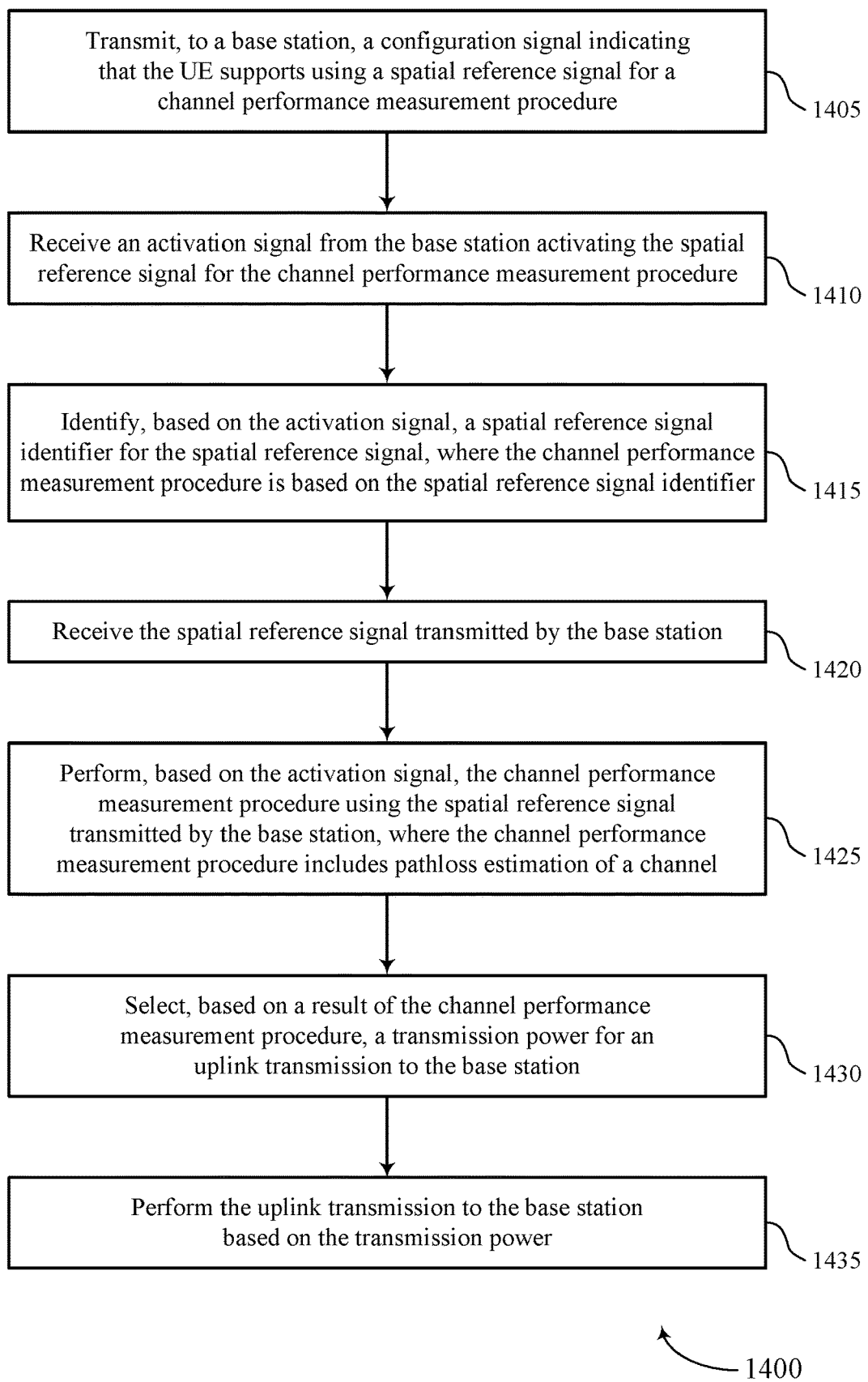

FIG. 14 shows a flowchart illustrating a method 1400 that supports using spatial reference signal for pathloss determination, in accordance with one or more aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may transmit, to a base station, a configuration signal indicating that the UE supports using a spatial reference signal for a channel performance measurement procedure. The operations of 1405 may be performed according to the methods described herein. In some examples, aspects of the operations of 1405 may be performed by a capability configuration manager as described with reference to FIGS. 5 through 8.

At 1410, the UE may receive an activation signal from the base station activating the spatial reference signal for the channel performance measurement procedure. The operations of 1410 may be performed according to the methods described herein. In some examples, aspects of the operations of 1410 may be performed by an activation manager as described with reference to FIGS. 5 through 8.

At 1415, the UE may identify, based on the activation signal, a spatial reference signal identifier for the spatial reference signal, where the channel performance measurement procedure is based on the spatial reference signal identifier. The operations of 1415 may be performed according to the methods described herein. In some examples, aspects of the operations of 1415 may be performed by a spatial reference signal identification manager as described with reference to FIGS. 5 through 8.

At 1420, the UE may receive the spatial reference signal transmitted by the base station. The operations of 1420 may be performed according to the methods described herein. In some examples, aspects of the operations of 1420 may be performed by a pathloss estimation manager as described with reference to FIGS. 5 through 8.

At 1425, the UE may perform, based on the activation signal, the channel performance measurement procedure using the spatial reference signal transmitted by the base station, where the channel performance measurement procedure includes pathloss estimation of a channel. The operations of 1425 may be performed according to the methods described herein. In some examples, aspects of the operations of 1425 may be performed by a pathloss estimation manager as described with reference to FIGS. 5 through 8.

At 1430, the UE may select, based on a result of the channel performance measurement procedure, a transmission power for an uplink transmission to the base station. The operations of 1430 may be performed according to the methods described herein. In some examples, aspects of the operations of 1430 may be performed by an uplink transmission manager as described with reference to FIGS. 5 through 8.

At 1435, the UE may perform the uplink transmission to the base station based on the transmission power. The operations of 1435 may be performed according to the methods described herein. In some examples, aspects of the operations of 1435 may be performed by an uplink transmission manager as described with reference to FIGS. 5 through 8.

Figure 15:
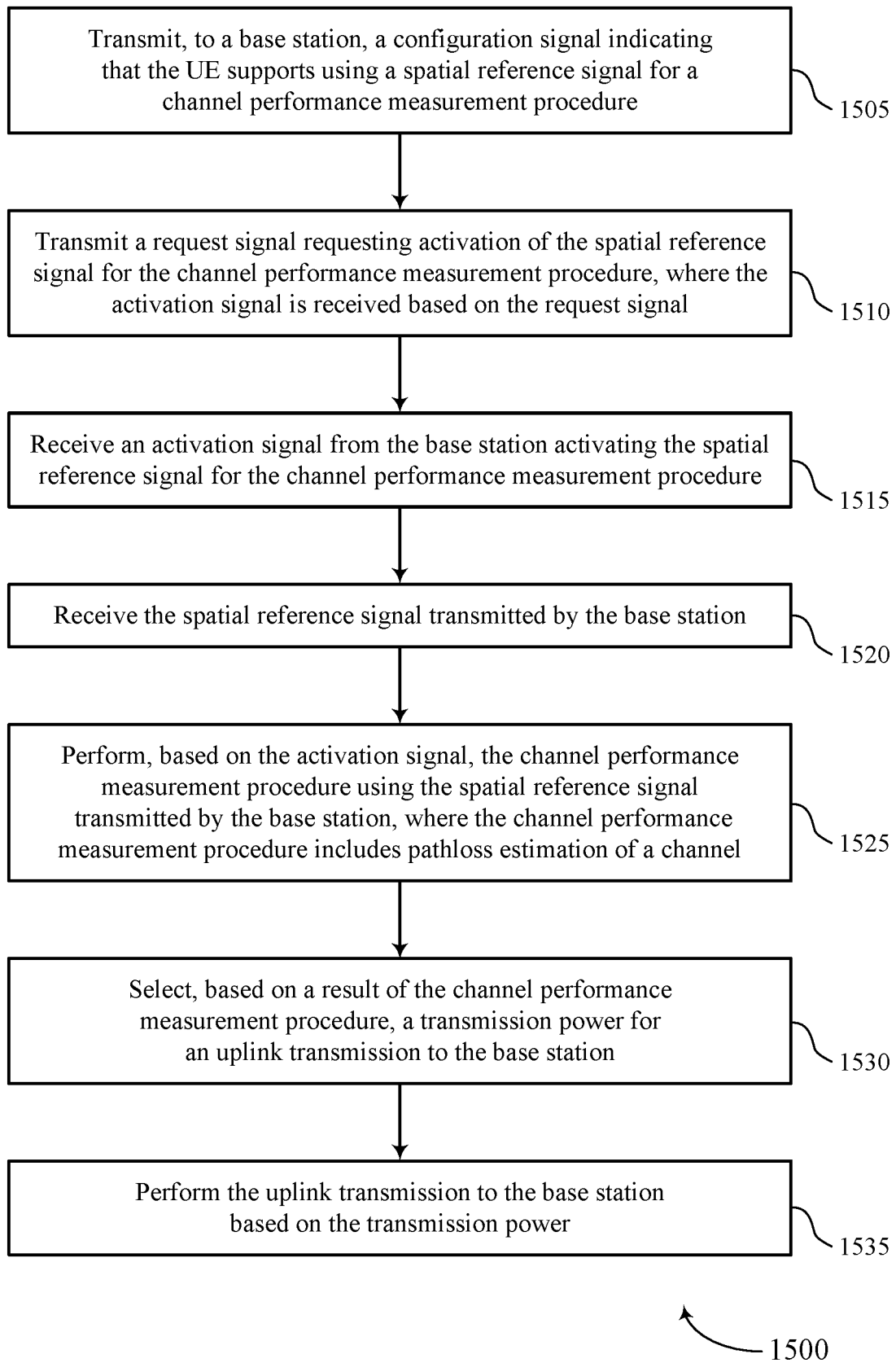

FIG. 15 shows a flowchart illustrating a method 1500 that supports using spatial reference signal for pathloss determination, in accordance with one or more aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may transmit, to a base station, a configuration signal indicating that the UE supports using a spatial reference signal for a channel performance measurement procedure. The operations of 1505 may be performed according to the methods described herein. In some examples, aspects of the operations of 1505 may be performed by a capability configuration manager as described with reference to FIGS. 5 through 8.

At 1510, the UE may transmit a request signal requesting activation of the spatial reference signal for the channel performance measurement procedure, where the activation signal is received based on the request signal. The operations of 1510 may be performed according to the methods described herein. In some examples, aspects of the operations of 1510 may be performed by a request manager as described with reference to FIGS. 5 through 8.

At 1515, the UE may receive an activation signal from the base station activating the spatial reference signal for the channel performance measurement procedure. The operations of 1515 may be performed according to the methods described herein. In some examples, aspects of the operations of 1515 may be performed by an activation manager as described with reference to FIGS. 5 through 8.

At 1520, the UE may receive the spatial reference signal transmitted by the base station. The operations of 1520 may be performed according to the methods described herein. In some examples, aspects of the operations of 1520 may be performed by a pathloss estimation manager as described with reference to FIGS. 5 through 8.

At 1525, the UE may perform, based on the activation signal, the channel performance measurement procedure using the spatial reference signal transmitted by the base station, where the channel performance measurement procedure includes pathloss estimation of a channel. The operations of 1525 may be performed according to the methods described herein. In some examples, aspects of the operations of 1525 may be performed by a pathloss estimation manager as described with reference to FIGS. 5 through 8.

At 1530, the UE may select, based on a result of the channel performance measurement procedure, a transmission power for an uplink transmission to the base station. The operations of 1530 may be performed according to the methods described herein. In some examples, aspects of the operations of 1530 may be performed by an uplink transmission manager as described with reference to FIGS. 5 through 8.

At 1535, the UE may perform the uplink transmission to the base station based on the transmission power. The operations of 1535 may be performed according to the methods described herein. In some examples, aspects of the operations of 1535 may be performed by an uplink transmission manager as described with reference to FIGS. 5 through 8.

Figure 16:
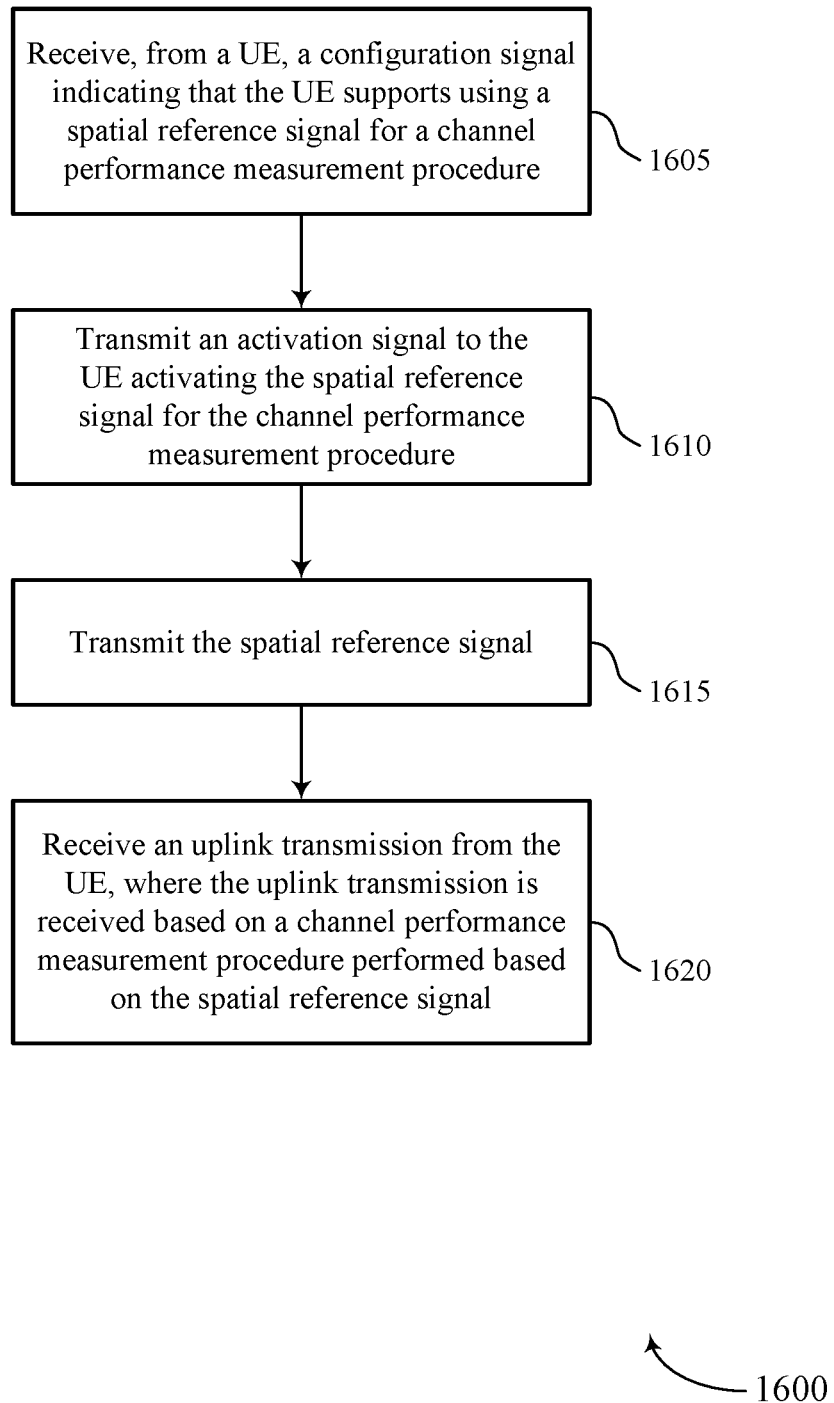

FIG. 16 shows a flowchart illustrating a method 1600 that supports using spatial reference signal for pathloss determination, in accordance with one or more aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may receive, from a UE, a configuration signal indicating that the UE supports using a spatial reference signal for a channel performance measurement procedure. The operations of 1605 may be performed according to the methods described herein. In some examples, aspects of the operations of 1605 may be performed by a capability configuration manager as described with reference to FIGS. 9 through 12.

At 1610, the base station may transmit an activation signal to the UE activating the spatial reference signal for the channel performance measurement procedure. The operations of 1610 may be performed according to the methods described herein. In some examples, aspects of the operations of 1610 may be performed by an activation manager as described with reference to FIGS. 9 through 12.

At 1615, the base station may transmit the spatial reference signal. The operations of 1615 may be performed according to the methods described herein. In some examples, aspects of the operations of 1615 may be performed by a spatial reference signal manager as described with reference to FIGS. 9 through 12.

At 1620, the base station may receive an uplink transmission from the UE, where the uplink transmission is received based on a channel performance measurement procedure performed based on the spatial reference signal. The operations of 1620 may be performed according to the methods described herein. In some examples, aspects of the operations of 1620 may be performed by an uplink transmission manager as described with reference to FIGS. 9 through 12.

Figure 17:
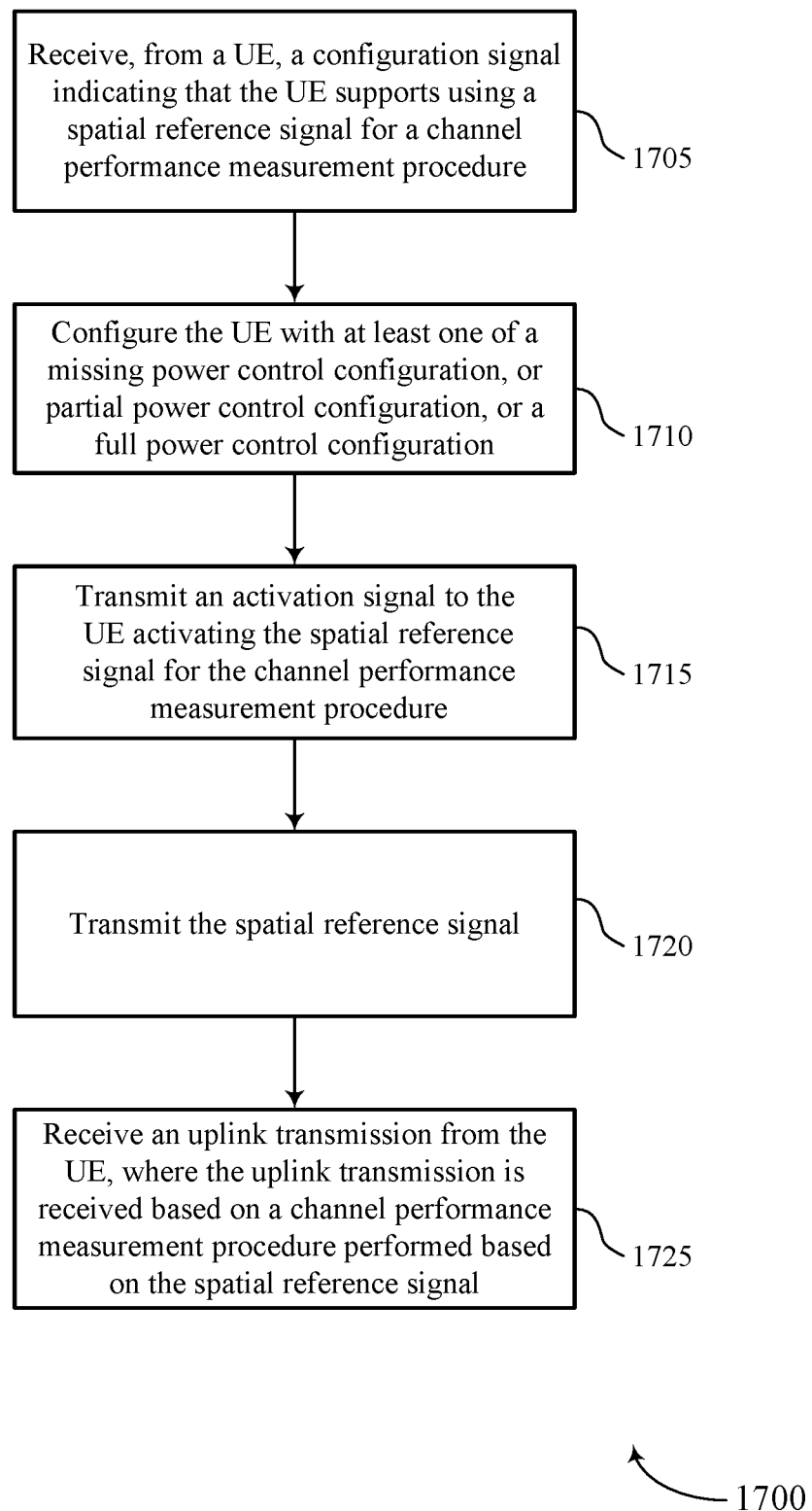

FIG. 17 shows a flowchart illustrating a method 1700 that supports using spatial reference signal for pathloss determination, in accordance with one or more aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may receive, from a UE, a configuration signal indicating that the UE supports using a spatial reference signal for a channel performance measurement procedure. The operations of 1705 may be performed according to the methods described herein. In some examples, aspects of the operations of 1705 may be performed by a capability configuration manager as described with reference to FIGS. 9 through 12.

At 1710, the base station may configure the UE with at least one of a missing power control configuration, or partial power control configuration, or a full power control configuration. The operations of 1710 may be performed according to the methods described herein. In some examples, aspects of the operations of 1710 may be performed by an activation manager as described with reference to FIGS. 9 through 12.

At 1715, the base station may transmit an activation signal to the UE activating the spatial reference signal for the channel performance measurement procedure. The operations of 1715 may be performed according to the methods described herein. In some examples, aspects of the operations of 1715 may be performed by a spatial reference signal manager as described with reference to FIGS. 9 through 12.

At 1720, the base station may transmit the spatial reference signal. The operations of 1720 may be performed according to the methods described herein. In some examples, aspects of the operations of 1720 may be performed by an uplink transmission manager as described with reference to FIGS. 9 through 12.

At 1725, the base station may receive an uplink transmission from the UE, where the uplink transmission is received based on a channel performance measurement procedure performed based on the spatial reference signal. The operations of 1725 may be performed according to the methods described herein. In some examples, aspects of the operations of 1725 may be performed by an uplink power control manager as described with reference to FIGS. 9 through 12.

It should be noted that the methods described herein describe possible implementations, and that the operations and the functions may be rearranged or otherwise modified and that other implementations are possible. Further, aspects from two or more of the methods may be combined.

The following provides an overview of further examples as described herein.

Example 1: A method for wireless communication at a UE, comprising transmitting, to a base station, a configuration signal indicating that the UE supports using a spatial reference signal for a channel performance measurement procedure receiving an activation signal from the base station activating the spatial reference signal for the channel performance measurement procedure receiving the spatial reference signal transmitted by the base station performing, based at least in part on the activation signal, the channel performance measurement procedure using the spatial reference signal transmitted by the base station, wherein the channel performance measurement procedure comprises pathloss estimation of a channel selecting, based at least in part on a result of the channel performance measurement procedure, a transmission power for an uplink transmission to the base station performing the uplink transmission to the base station based at least in part on the transmission power.

Example 2: The method of example 1, wherein selecting the transmission power comprises: transmitting a request signal requesting activation of the spatial reference signal for the channel performance measurement procedure determining that the UE is configured with a missing power control configuration for the uplink transmission disabling fractional power control for the uplink transmission selecting a default value for a target receive power level at the base station for the uplink transmission.

Example 3: The method of any one of examples 1 through 2, wherein selecting the transmission power comprises: transmitting a request signal requesting activation of the spatial reference signal for the channel performance measurement procedure determining that the UE is configured with a partial power control configuration for the uplink transmission enabling fractional power control for the uplink transmission based at least in part on the partial power control configuration selecting a value for a target receive power level at the base station for the uplink transmission based at least in part on the partial power control configuration.

Example 4: The method of any one of examples 1 through 3, wherein selecting the transmission power comprises: determining that the UE is configured with a full power control configuration for the uplink transmission selecting the transmission power based at least in part on the full power control configuration.

Example 5: The method of any one of examples 1 through 4, further comprising identifying, based at least in part on the activation signal, a spatial reference signal identifier for the spatial reference signal, wherein the channel performance measurement procedure is based at least in part on the spatial reference signal identifier.

Example 6: The method of any one of examples 1 through 5, further comprising transmitting a request signal requesting activation of the spatial reference signal for the channel performance measurement procedure, wherein the activation signal is received based at least in part on the request signal.

Example 7: The method of any one of examples 1 through 6, wherein the configuration signal comprises an RRC configuration signal.

Example 8: The method of any one of examples 1 through 7, wherein transmitting the configuration signal further comprises: transmitting the configuration signal in an initial access procedure or handover procedure.

Example 9: The method any one of examples 1 through 8, wherein the activation signal comprises at least one of an MAC CE, or an RRC signal, or a DCI, or a combination thereof.

Example 10: The method of any one of examples 1 through 9, further comprising receiving a downlink pathloss reference signal from the base station, wherein performing the channel performance measurement procedure is further based at least in part on the downlink pathloss reference signal.

Example 11: A method for wireless communication at a base station, comprising receiving, from a UE, a configuration signal indicating that the UE supports using a spatial reference signal for a channel performance measurement procedure transmitting an activation signal to the UE activating the spatial reference signal for the channel performance measurement procedure transmitting the spatial reference signal receiving an uplink transmission from the UE, wherein the uplink transmission is received based at least in part on a channel performance measurement procedure performed based at least in part on the spatial reference signal.

Example 12: The method of example 11, further comprising receiving a request signal from the UE requesting activation of the spatial reference signal for the channel performance measurement procedure, wherein the activation is transmitted based at least in part on the request signal.

Example 13: The method of any one of examples 11 through 12, further comprising configuring the UE with at least one of a missing power control configuration, or partial power control configuration, or a full power control configuration.

Example 14: The method of any one of examples 11 through 13, wherein the configuration signal comprises an RRC configuration signal.

Example 15: The method of any one of examples 11 through 14, wherein the activation signal comprises at least one of an MAC CE, or an RRC signal, or a DCI, or a combination thereof.

Example 16: An apparatus for wireless communication at a base station comprising at least one means for performing a method of any one of examples 1 through 11.

Example 17: An apparatus for wireless communication at a base station comprising a processor and memory couple to the processor, the processor and memory configured to cause the apparatus to perform a method of any one of examples 1 through 11.

Example 18: A non-transitory computer-readable medium storing code for wireless communication at a base station comprising a processor, memory in electronic communication with the processor, and instructions stored in the memory and executable by the processor to cause the apparatus to perform a method of any one of examples 1 through 11.

Example 19: An apparatus for wireless communication at a base station comprising at least one means for performing a method of any one of examples 11 through 15.

Example 20: An apparatus for wireless communication at a base station comprising a processor and memory couple to the processor, the processor and memory configured to cause the apparatus to perform a method of any one of examples 11 through 15.

Example 21: A non-transitory computer-readable medium storing code for wireless communication at a base station comprising a processor, memory in electronic communication with the processor, and instructions stored in the memory and executable by the processor to cause the apparatus to perform a method of any one of examples 11 through 15.

Techniques described herein may be used for various wireless communication systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communication systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary function that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    transmitting, to a base station, a capability signal indicating that the UE supports using a downlink control channel reference signal for a channel performance measurement procedure;
    receiving an indication signal from the base station activating the downlink control channel reference signal;
    receiving the downlink control channel reference signal transmitted by the base station;
    performing, based at least in part on the indication signal, the channel performance measurement procedure using the downlink control channel reference signal transmitted by the base station, wherein the channel performance measurement procedure comprises pathloss estimation of a channel;
    selecting, based at least in part on a result of the channel performance measurement procedure, a transmission power for an uplink transmission to the base station; and
    performing the uplink transmission to the base station based at least in part on the transmission power.

2. The method of claim 1, wherein selecting the transmission power comprises:
    determining that the UE is configured with a full power control configuration for the uplink transmission; and
    selecting the transmission power based at least in part on the full power control configuration.

3. The method of claim 1, further comprising:
    identifying, based at least in part on the indication signal, a spatial reference signal identifier for the downlink control channel reference signal, wherein the channel performance measurement procedure is based at least in part on the spatial reference signal identifier.

4. The method of claim 1, further comprising:
    transmitting a request signal requesting activation of the downlink control channel reference signal for the channel performance measurement procedure, wherein the indication signal is received based at least in part on the request signal.

5. The method of claim 1, wherein the capability signal comprises a radio resource control (RRC) configuration signal.

6. The method of claim 1, wherein transmitting the capability signal further comprises:
    transmitting the capability signal in an initial access procedure or handover procedure.

7. The method of claim 1, wherein the indication signal comprises at least one of a medium access control (MAC) control element (CE), or a radio resource control (RRC) signal, or a downlink control information (DCI), or a combination thereof.

8. The method of claim 1, further comprising:
receiving a downlink pathloss reference signal from the base station, wherein performing the channel performance measurement procedure is further based at least in part on the downlink pathloss reference signal.

9. The method of claim 1, wherein selecting the transmission power further comprises:
determining that the UE is configured with a missing power control configuration for the uplink transmission.

10. The method of claim 9, wherein selecting the transmission power further comprises:
transmitting a request signal requesting activation of the downlink control channel reference signal for the channel performance measurement procedure;
disabling fractional power control for the uplink transmission; and
selecting a default value for a target receive power level at the base station for the uplink transmission.

11. The method of claim 1, wherein selecting the transmission power comprises:
determining that the UE is configured with a partial power control configuration for the uplink transmission.

12. The method of claim 11, wherein selecting the transmission power comprises:
transmitting a request signal requesting activation of the downlink control channel reference signal for the channel performance measurement procedure;
enabling fractional power control for the uplink transmission based at least in part on the partial power control configuration; and
selecting a value for a target receive power level at the base station for the uplink transmission based at least in part on the partial power control configuration.

13. A method for wireless communication at a base station, comprising:
receiving, from a user equipment (UE), a capability signal indicating that the UE supports using a downlink control channel reference signal for a channel performance measurement procedure;
transmitting an indication signal to the UE activating the downlink control channel reference signal;
transmitting the downlink control channel reference signal; and
receiving an uplink transmission from the UE, wherein the uplink transmission is received based at least in part on a channel performance measurement procedure performed based at least in part on the downlink control channel reference signal.

14. The method of claim 13, further comprising:
receiving a request signal from the UE requesting activation of the downlink control channel reference signal for the channel performance measurement procedure, wherein the indication signal is transmitted based at least in part on the request signal.

15. The method of claim 13, further comprising:
configuring the UE with at least one of a missing power control configuration, or partial power control configuration, or a full power control configuration.

16. The method of claim 13, wherein the capability signal comprises a radio resource control (RRC) configuration signal.

17. The method of claim 13, wherein the indication signal comprises at least one of a medium access control (MAC) control element (CE), or a radio resource control (RRC) signal, or a downlink control information (DCI), or a combination thereof.

18. An apparatus for wireless communication at a user equipment (UE), comprising:
a processor; and
memory coupled to the processor, the processor and memory configured to:
transmit, to a base station, a capability signal indicating that the UE supports using a downlink control channel reference signal for a channel performance measurement procedure;
receive an indication signal from the base station activating the downlink control channel reference signal;
receive the downlink control channel reference signal transmitted by the base station;
perform, based at least in part on the indication signal, the channel performance measurement procedure using the downlink control channel reference signal transmitted by the base station, wherein the channel performance measurement procedure comprises pathloss estimation of a channel;
select, based at least in part on a result of the channel performance measurement procedure, a transmission power for an uplink transmission to the base station; and
perform the uplink transmission to the base station based at least in part on the transmission power.

19. The apparatus of claim 18, wherein the processor and memory configured to select the transmission power are further configured to:
transmit a request signal requesting activation of the downlink control channel reference signal for the channel performance measurement procedure;
determine that the UE is configured with a missing power control configuration for the uplink transmission;
disable fractional power control for the uplink transmission; and
select a default value for a target receive power level at the base station for the uplink transmission.

20. The apparatus of claim 18, wherein the processor and memory configured to select the transmission power are further configured to:
transmit a request signal requesting activation of the downlink control channel reference signal for the channel performance measurement procedure;
determine that the UE is configured with a partial power control configuration for the uplink transmission;
enable fractional power control for the uplink transmission based at least in part on the partial power control configuration; and
select a value for a target receive power level at the base station for the uplink transmission based at least in part on the partial power control configuration.

21. The apparatus of claim 18, wherein the processor and memory configured to select the transmission power are further configured to:
determine that the UE is configured with a full power control configuration for the uplink transmission; and
select the transmission power based at least in part on the full power control configuration.

22. The apparatus of claim 18, wherein the processor and memory are further configured to:

identify, based at least in part on the indication signal, a spatial reference signal identifier for the downlink control channel reference signal, wherein the channel performance measurement procedure is based at least in part on the spatial reference signal identifier.

23. The apparatus of claim 18, wherein the processor and memory are further configured to:
transmit a request signal requesting activation of the downlink control channel reference signal for the channel performance measurement procedure, wherein the indication signal is received based at least in part on the request signal.

24. The apparatus of claim 18, wherein the capability signal comprises a radio resource control (RRC) configuration signal.

25. The apparatus of claim 18, wherein the processor and memory configured to transmit the capability signal are further configured to:
transmit the capability signal in an initial access procedure or handover procedure.

26. The apparatus of claim 18, wherein the indication signal comprises at least one of a medium access control (MAC) control element (CE), or a radio resource control (RRC) signal, or a downlink control information (DCI), or a combination thereof.

27. The apparatus of claim 18, wherein the processor and memory are further configured to:
receive a downlink pathloss reference signal from the base station, wherein performing the channel performance measurement procedure is further based at least in part on the downlink pathloss reference signal.

28. An apparatus for wireless communication at a base station, comprising:
a processor; and
memory coupled to the processor, the processor and memory configured to:
receive, from a user equipment (UE), a capability signal indicating that the UE supports using a downlink control channel reference signal for a channel performance measurement procedure;
transmit an indication signal to the UE activating the downlink control channel reference signal for the channel performance measurement procedure;
transmit the downlink control channel reference signal; and
receive an uplink transmission from the UE, wherein the uplink transmission is received based at least in part on a channel performance measurement procedure performed based at least in part on the downlink control channel reference signal.

29. The apparatus of claim 28, wherein the processor and memory are further configured to:
receiving a request signal from the UE requesting activation of the downlink control channel reference signal for the channel performance measurement procedure, wherein the indication signal is transmitted based at least in part on the request signal.

30. The apparatus of claim 28, wherein the processor and memory are further configured to:
configuring the UE with at least one of a missing power control configuration, or partial power control configuration, or a full power control configuration.

31. The apparatus of claim 28, wherein the capability signal comprises a radio resource control (RRC) configuration signal.

32. The apparatus of claim 28, wherein the indication signal comprises at least one of a medium access control (MAC) control element (CE), or a radio resource control (RRC) signal, or a downlink control information (DCI), or a combination thereof.

* * * * *